(12) United States Patent
Chang et al.

(10) Patent No.: US 12,088,899 B2
(45) Date of Patent: Sep. 10, 2024

(54) CAMERA MODULE AND ELECTRONIC DEVICE

(71) Applicant: LARGAN DIGITAL CO., LTD., Taichung (TW)

(72) Inventors: Lin An Chang, Taichung (TW); Ming-Ta Chou, Taichung (TW); Te-Sheng Tseng, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 127 days.

(21) Appl. No.: 17/461,774

(22) Filed: Aug. 30, 2021

(65) Prior Publication Data

US 2022/0394159 A1 Dec. 8, 2022

(30) Foreign Application Priority Data

Jun. 2, 2021 (TW) ................................. 110120061

(51) Int. Cl.
*H04N 23/55* (2023.01)
*G02B 9/04* (2006.01)
(Continued)

(52) U.S. Cl.
CPC ............... *H04N 23/55* (2023.01); *G02B 9/04* (2013.01); *G02B 13/007* (2013.01); *H04N 23/54* (2023.01);
(Continued)

(58) Field of Classification Search
CPC .... H04N 23/55; H04N 23/54; H04N 5/23283; G02B 9/04; G02B 13/007; G02B 7/08;
(Continued)

(56) References Cited

U.S. PATENT DOCUMENTS 7,248,419 B2 * 7/2007 Takahashi .............. G03B 17/17
348/340
10,334,146 B2 6/2019 Im et al.
(Continued)

FOREIGN PATENT DOCUMENTS

CN 208351110 U 1/2019
CN 109491055 A 3/2019
(Continued)

OTHER PUBLICATIONS

IN Examination Report in Application No. 202134057600 Dated Dec. 13, 2022.
(Continued)

*Primary Examiner* — Jie Lei
*Assistant Examiner* — Kuei-Jen L Edenfield
(74) *Attorney, Agent, or Firm* — Maschoff Brennan

(57) ABSTRACT

A camera module includes a fixed component, an optical folding component, a first imaging unit, a second imaging unit, and a driving device. The optical folding component is disposed on the fixed component. The optical folding component has a reflection surface disposed at an image side of an optical curved surface. The first imaging unit is disposed at an image side of the optical folding component. The second imaging unit is disposed between the optical folding component and the first imaging unit. The driving device move the first lens carrier with respect to the fixed component. The optical curved surface is an object-side surface of the optical folding component. The optical folding component has positive refractive power through the optical curved surface.

20 Claims, 20 Drawing Sheets

(51) Int. Cl.
  *G02B 13/00* (2006.01)
  *G03B 5/02* (2021.01)
  *H04N 23/54* (2023.01)
(52) U.S. Cl.
  CPC ........ *G03B 5/02* (2013.01); *G03B 2205/0046* (2013.01); *G03B 2205/0069* (2013.01)
(58) Field of Classification Search
  CPC .......... G02B 7/09; G02B 7/10; G02B 27/646; G02B 5/04; G02B 13/00; G03B 5/02; G03B 2205/0046; G03B 2205/0069; G03B 3/02; G03B 3/10; G03B 17/17; G03B 13/36; G03B 30/00; G03B 17/566; G03B 17/565; G03B 17/04
  USPC ........ 359/736, 678, 696, 698, 699, 793, 819
  See application file for complete search history.

(56) References Cited

U.S. PATENT DOCUMENTS

| | | | |
|---|---|---|---|
| 10,816,756 B2 | 10/2020 | Lee et al. | |
| 10,948,696 B2* | 3/2021 | Shabtay | G02B 9/64 |
| 11,480,809 B2* | 10/2022 | Kazuo | G02B 27/646 |
| 2006/0209437 A1 | 9/2006 | Miyamoto | |
| 2009/0153726 A1 | 6/2009 | Lim | |
| 2012/0026384 A1 | 2/2012 | Yamada | |
| 2016/0154204 A1* | 6/2016 | Lim | G02B 27/646 |
| | | | 359/557 |
| 2019/0331897 A1 | 10/2019 | Lee | |
| 2020/0028999 A1 | 1/2020 | Jun | |
| 2020/0073028 A1 | 3/2020 | Shigemitsu et al. | |
| 2020/0137274 A1 | 4/2020 | Lee et al. | |
| 2020/0351421 A1* | 11/2020 | Park | H04N 23/54 |

FOREIGN PATENT DOCUMENTS

| | | |
|---|---|---|
| CN | 208847939 U | 5/2019 |
| CN | 209486371 U | 10/2019 |
| CN | 110989141 A | 4/2020 |
| CN | 210776140 U | 6/2020 |
| CN | 211236427 U | 8/2020 |
| CN | 112241061 A | 1/2021 |

OTHER PUBLICATIONS

European Search Report in Application No. 21204645.2 Dated Aug. 1, 2022.
TW Office Action in Application No. 110120061 Dated Jun. 6, 2022.

* cited by examiner

CAMERA MODULE AND ELECTRONIC DEVICE

RELATED APPLICATIONS

This application claims priority to Taiwan Application 110120061, filed on Jun. 2, 2021, which is incorporated by reference herein in its entirety.

BACKGROUND

Technical Field

The present disclosure relates to a camera module and an electronic device, more particularly to a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems, especially the telephoto optical systems with a long focal length, are difficult to meet both the requirements of high image quality and miniaturization. Conventional telephoto optical systems usually have shortcomings of high current consumption and low moving efficiency, thereby unable to meet the requirements of the current technology trends. Therefore, how to improve the current consumption and the moving efficiency of the telephoto optical systems for meeting the requirement of high-end-specification electronic devices is an important topic in this field nowadays.

SUMMARY

According to one aspect of the present disclosure, a camera module has an optical axis and an optical curved surface through which the optical axis passes. The camera module includes a fixed component, an optical folding component, a first imaging unit, a second imaging unit, and a first driving device. The optical folding component is disposed on the fixed component. The optical folding component has a reflection surface configured to fold the optical axis. The optical curved surface is disposed at an object side of the reflection surface. The first imaging unit is disposed at an image side of the optical folding component. The first imaging unit includes a first lens carrier and a first optical imaging lens assembly accommodated in the first lens carrier. The second imaging unit is disposed between the optical folding component and the first lens carrier of the first imaging unit. The second imaging unit includes a second lens carrier and a second optical imaging lens assembly. The second lens carrier is fixed on the fixed component. The second optical imaging lens assembly is accommodated in the second lens carrier. The first driving device moves the first lens carrier along the optical axis with respect to the fixed component. The first driving device includes a first driving magnet and a first driving coil. The first driving magnet is disposed on the first lens carrier. The first driving coil corresponds to the first driving magnet. The optical curved surface is an object-side surface of the optical folding component. The optical folding component has positive refractive power through the optical curved surface. When the number of lens elements of the first optical imaging lens assembly is N1, the number of lens elements of the second optical imaging lens assembly is N2, and the total number of lens elements of the camera module is Nt, the following conditions are satisfied:

$N1 < N2$; and $N1 + N2 < Nt$.

According to another aspect of the present disclosure, a camera module has an optical axis and an optical curved surface through which the optical axis passes. The camera module includes a fixed component, an optical folding component, a first imaging unit, a second imaging unit, and a first driving device. The optical folding component is disposed on the fixed component. The optical folding component has a reflection surface configured to fold the optical axis. The optical curved surface is disposed at an object side of the reflection surface. The first imaging unit is disposed at an image side of the optical folding component. The first imaging unit includes a first lens carrier and a first optical imaging lens assembly accommodated in the first lens carrier. The second imaging unit is disposed between the optical folding component and the first lens carrier of the first imaging unit. The second imaging unit includes a second lens carrier and a second optical imaging lens assembly. The second lens carrier is fixed on the fixed component, and the second optical imaging lens assembly is accommodated in the second lens carrier. The first driving device includes a first driving magnet, a first driving coil, and at least two location sensing components. The first driving magnet is disposed on the first lens carrier. The first driving coil corresponds to the first driving magnet, such that the first lens carrier is movable along the optical axis with respect to the fixed component. The at least two location sensing components correspond to the first lens carrier. When a distance in parallel with the optical axis between center points of two of the at least two location sensing components is DH, a distance by which the first lens carrier is movable along the optical axis with respect to the fixed component is D, the number of lens elements of the first optical imaging lens assembly is N1, the number of lens elements of the second optical imaging lens assembly is N2, and the total number of lens elements of the camera module is Nt, the following conditions are satisfied:

$0.3 < DH/D < 9$;

$N1 < N2$; and $N1 + N2 < Nt$.

According to another aspect of the present disclosure, an electronic device includes one the aforementioned camera modules and an image sensor, wherein the image sensor is disposed on an image surface of the camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
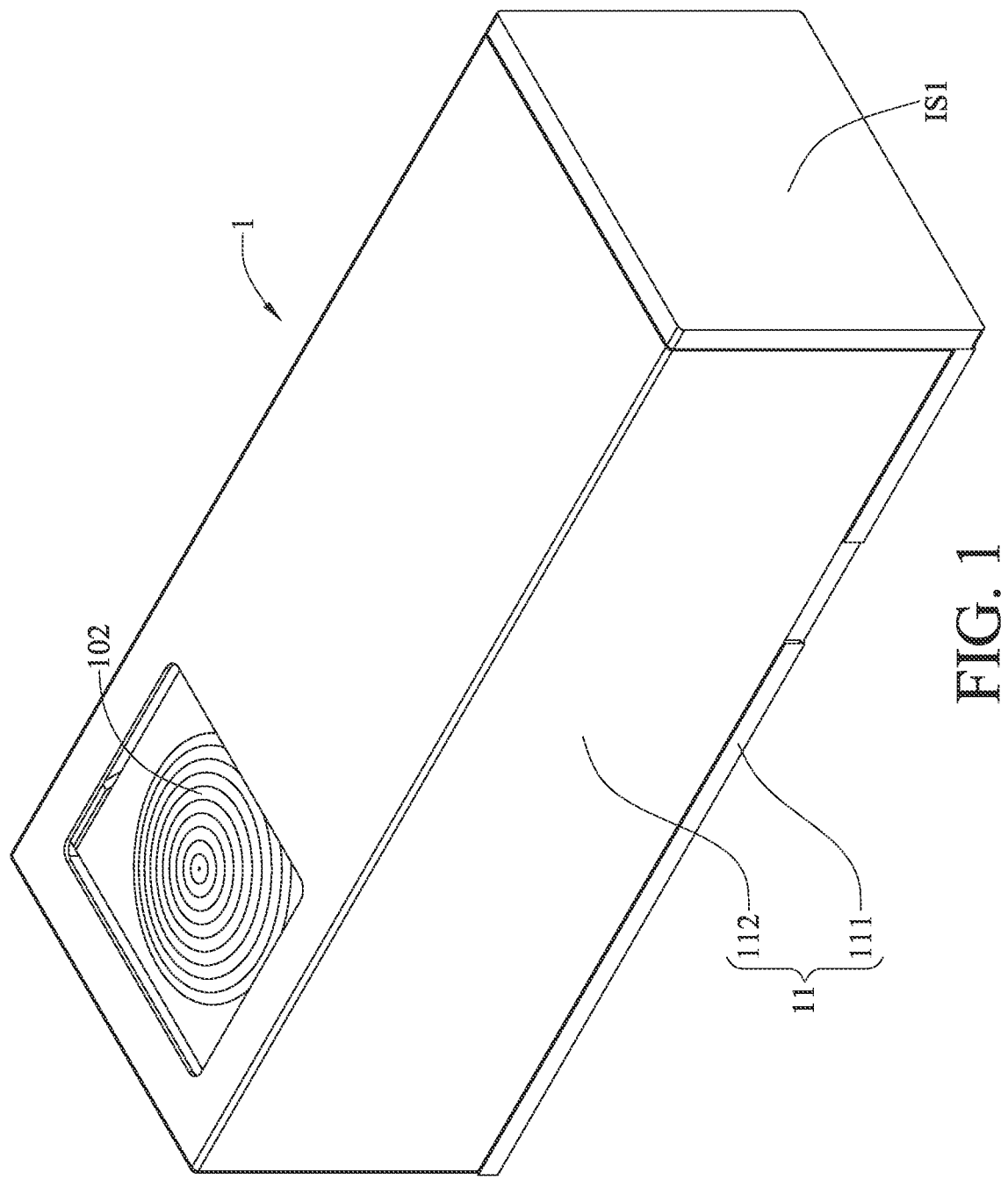
FIG. 1 is a perspective view of an electronic device according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A camera module provided in the present disclosure has an optical axis and an optical curved surface through which the optical axis passes. The camera module includes a fixed component, an optical folding component, a first imaging unit, a second imaging unit, and a first driving device.

The fixed component can be a base, a housing, or a combination thereof, and the present disclosure is not limited thereto.

The optical folding component is disposed on the fixed component. The optical folding component has a reflection surface configured to fold the optical axis, and the optical curved surface is disposed at an object side of the reflection surface. Moreover, the optical curved surface can be an object-side surface of the optical folding component, and the optical folding component has positive refractive power through the optical curved surface. Therefore, it is favorable for increasing the light convergence ability of the camera module and reducing the size of the camera module. Please refer to FIG. 4, which shows the object-side surface of the optical folding component 12 as the optical curved surface 102 according to the 1st embodiment of the present disclosure.

The optical folding component can be an integrally molded plastic component, an assembly in which a plastic lens element is adhered to a glass prism, or an assembly in which a plastic lens element is adhered to a plastic prism, and the present disclosure is not limited thereto. Please refer to FIG. 4, which shows the optical folding component 12 integrally formed by plastic injection molding according to the 1st embodiment of the present disclosure. Please refer to FIG. 16, which shows the optical folding component 42 formed by attaching the plastic lens element PL to the glass prism GP through the adhesive material AM according to the 4th embodiment of the present disclosure. Please refer to FIG. 17, which shows the optical folding component 52 formed by attaching the plastic lens element PL to the plastic prism PP through the adhesive material AM according to the 5th embodiment of the present disclosure.

The first imaging unit is located at an image side of the optical folding component. The first imaging unit includes a first lens carrier and a first optical imaging lens assembly. The first lens carrier is movably disposed on the fixed component. The first optical imaging lens assembly is accommodated in the first lens carrier.

The second imaging unit is disposed between the optical folding component and the first lens carrier of the first imaging unit. The second imaging unit includes a second lens carrier and a second optical imaging lens assembly. The second lens carrier is fixed on the fixed component. The second optical imaging lens assembly is accommodated in the second lens carrier.

The first driving device includes a first driving magnet and a first driving coil. The first driving magnet is disposed on the first lens carrier. The first driving coil corresponds to the first driving magnet. Moreover, the first driving device can move the first lens carrier along the optical axis with respect to the fixed component. It can also be considered that the correspondence between the first driving coil and the first driving magnet allows the first lens carrier to be movable along the optical axis with respect to the fixed component. The movement of the first lens carrier can drive the first optical imaging lens assembly accommodated therein to move between the location for short focusing distance (e.g., an object distance of 1 meter) and the location for long focusing distance (e.g., an object distance of infinity) along the optical axis with respect to the fixed component. Please refer to FIG. 5, FIG. 9, and FIG. 13, which respectively show the first optical imaging lens assemblies 132, 232, and 332 focusing at short distances. Please refer to FIG. 6, FIG. 10, and FIG. 14, which respectively show the first optical imaging lens assemblies 132, 232, and 332 focusing at long distances.

Moreover, the number of the first driving magnet can be two, the number of the first driving coil can be two, the first driving magnets can be disposed symmetrical about the optical axis, and the first driving coils can be disposed symmetrical about the optical axis. Therefore, it is favorable for achieving a weight-balanced configuration so as to prevent tilt when moving the first lens carrier. Moreover, the first driving device can further include at least two location sensing components corresponding to the first lens carrier. Therefore, it is favorable for determining the location of the first lens carrier by the location sensing components, thereby achieving a long-distance driving control. Moreover, the at least two location sensing components can further sense the location of the first driving magnet or other sensing magnet, and the present disclosure is not limited thereto. Moreover, the number of the at least two location sensing components can be two, and the location sensing components can respectively correspond to the abovementioned two first driving magnets. Therefore, it is favorable for preventing signal interference between each location sensing component and each driving magnet. Moreover, the number of the at least two location sensing components can also be three, and the location sensing components can respectively correspond to three sides of the first driving magnet. Therefore, it is favorable for accurately sensing the location of the first lens carrier by properly arranging the location sensing components so as to increase the focusing speed and provide a better user experience.

When the number of lens elements of the first optical imaging lens assembly is N1, the number of lens elements of the second optical imaging lens assembly is N2, and the total number of lens elements of the camera module is Nt, the following conditions are satisfied: N1<N2; and N1+N2<Nt. Please be noted that the lens elements described in the specification can include the abovementioned optical folding component with refractive power and the optical imaging lens element of each optical imaging lens assembly. Moreover, the number of lens elements of the first optical imaging lens assembly can less than or equal to two. Therefore, it is favorable for performing auto focus through a relatively less amount of lens element(s), thereby reducing manufacturing tolerance and increasing yield rate.

According to the camera module discussed above, by arranging the optical curved surface at the object side and distributing the lens elements to a plurality of imaging units, only driving an imaging unit with a relatively less amount of lens element(s) at the image side can achieve auto focus function. By doing so, the weight of the components to be moved can thus be reduced, such that the driving current consumed by the first driving device can also be reduced, thereby providing high moving efficiency and reducing total power consumption.

According to the present disclosure, the camera module can further include a ball element disposed between the first lens carrier and the fixed component, and the first lens carrier can be supported by the ball element so as to achieve the abovementioned movable configuration thereof with respect to the fixed component. Therefore, it is favorable for providing stability of long-distance driving.

According to the present disclosure, the camera module can further include a second driving device. The second driving device can include a second driving magnet, a second driving coil, an optical folding component carrier, a supporting component, and an elastic connection component, but the present disclosure is not limited thereto. The second driving device can rotate the optical folding component with respect to the fixed component. Therefore, it is favorable for providing optical image stabilization for the camera module.

According to the present disclosure, the camera module can further include a positive lens element disposed at an object side of the optical folding component, and the optical curved surface can be one of an object-side surface and an image-side surface of the positive lens element. Therefore, it is favorable for increasing the light convergence ability of the camera module. Please refer to FIG. 12, which shows the positive lens element 30 disposed at the object side of the optical folding component 32 according to the 3rd embodiment of the present disclosure, and the optical curved surface 302 is the object-side surface of the positive lens element 30.

When a distance in parallel with the optical axis between center points of two of the at least two location sensing components is DH, and a distance by which the first lens carrier is movable along the optical axis with respect to the fixed component is D, the following condition can be satisfied: 0.3<DH/D<9. Therefore, it is favorable for effectively increasing the range of sensing the location of the first lens carrier on the optical axis. Moreover, the following condition can also be satisfied: 0.37 [mm]<DH<4.5 [mm]. Therefore, it is favorable for providing a wide sensing range with a stable signal. Please refer to FIG. 5 and FIG. 7, which respectively show D and DH according to the 1st embodiment of the present disclosure.

When the distance by which the first lens carrier is movable along the optical axis with respect to the fixed component is D, the following condition can be satisfied: 0.2 [mm]≤D≤2.0 [mm]. Therefore, it is favorable for providing a long-distance driving space and stabilizing the focus state of the camera module. Moreover, the following condition can also be satisfied: 0.4 [mm]≤D≤1.5 [mm]. Therefore, it is favorable for taking into account the image resolutions when focusing at a short distance and a long distance so as to providing the distance range with better optical imaging quality.

When a maximum field of view of the camera module is FOV, the following condition can be satisfied: 1 [deg.] ≤FOV≤40 [deg.]. Therefore, it is favorable for providing a telephoto camera module with small viewing angle.

When a total length of the first lens carrier along the optical axis is L, the following condition can be satisfied: 1.0 [mm]<L<4.0 [mm]. Therefore, it is favorable for providing miniaturization for the camera module and reducing mechanism complexity. Please refer to FIG. 5, which shows L according to the 1st embodiment of the present disclosure.

According to the present disclosure, the aforementioned features and conditions can be utilized in numerous combinations so as to achieve corresponding effect.

An electronic device further provided in the present disclosure includes a camera module that has any combination of the abovementioned technical features and an image sensor that is disposed on an image surface of the camera module.

According to the present disclosure, the electronic device can further include an optical image stabilization driver that is disposed on the image sensor and can move the image sensor on a plane perpendicular to the optical axis. Therefore, it is favorable for achieving the function of optical image stabilization. Please refer to FIG. 18, which shows the optical image stabilization driver OIS disposed on the image sensor IS6.

According to the above description of the present disclosure, the following specific embodiments are provided for further explanation.

1st Embodiment

Figure 2:
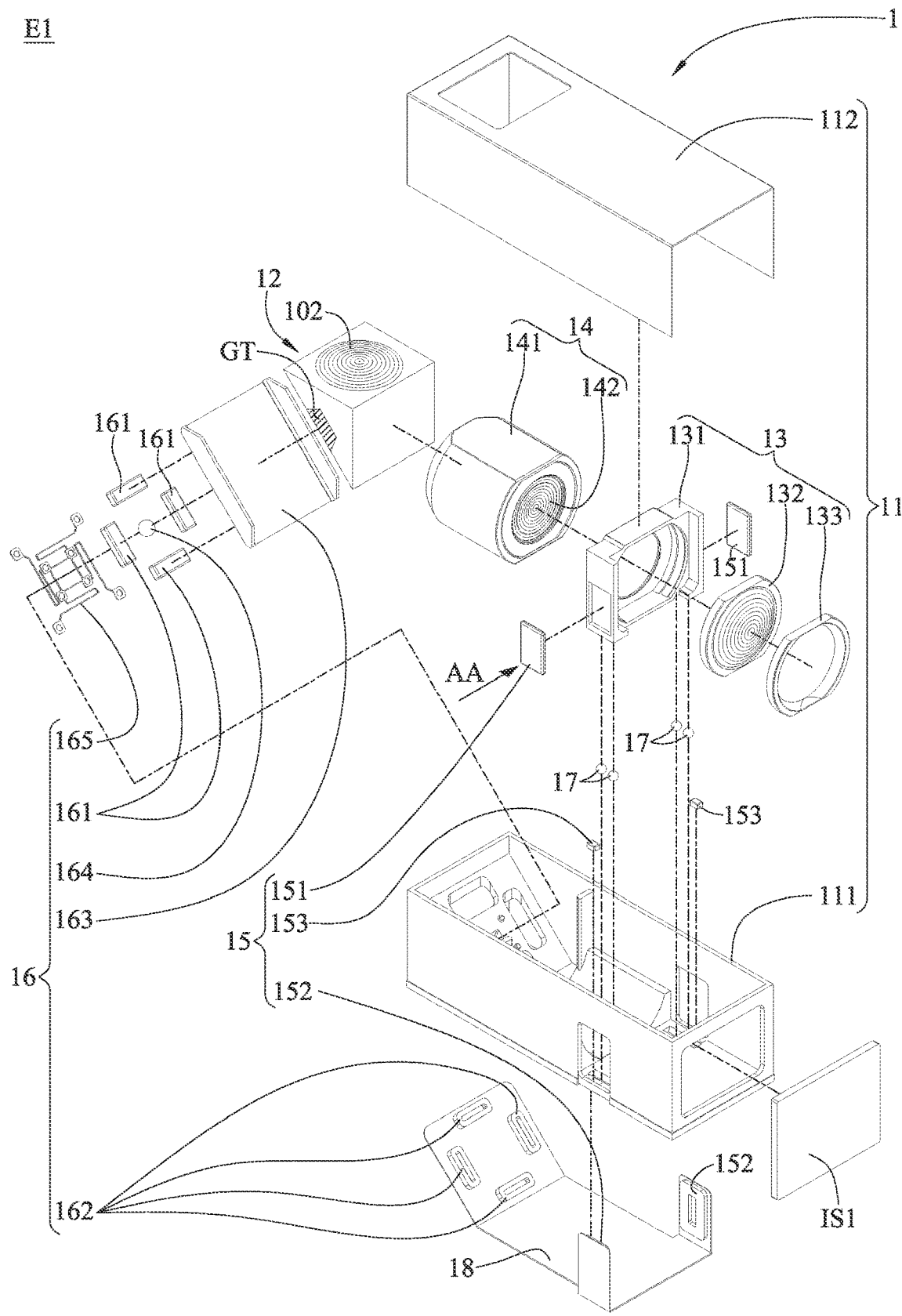
FIG. 2 is an exploded view of the electronic device in FIG. 1.
Figure 3:
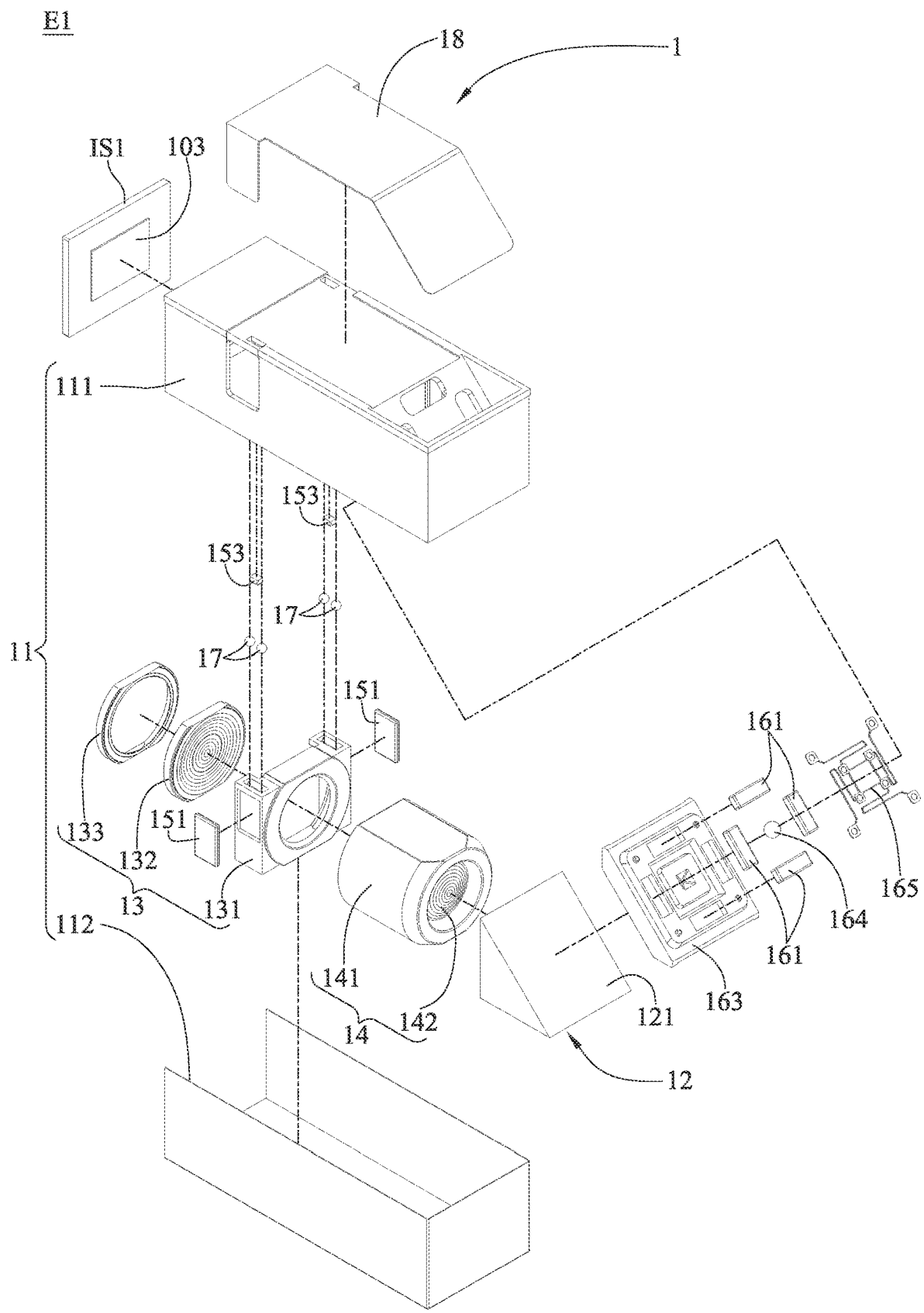
FIG. 3 is another exploded view of the electronic device in FIG. 1.
Figure 4:
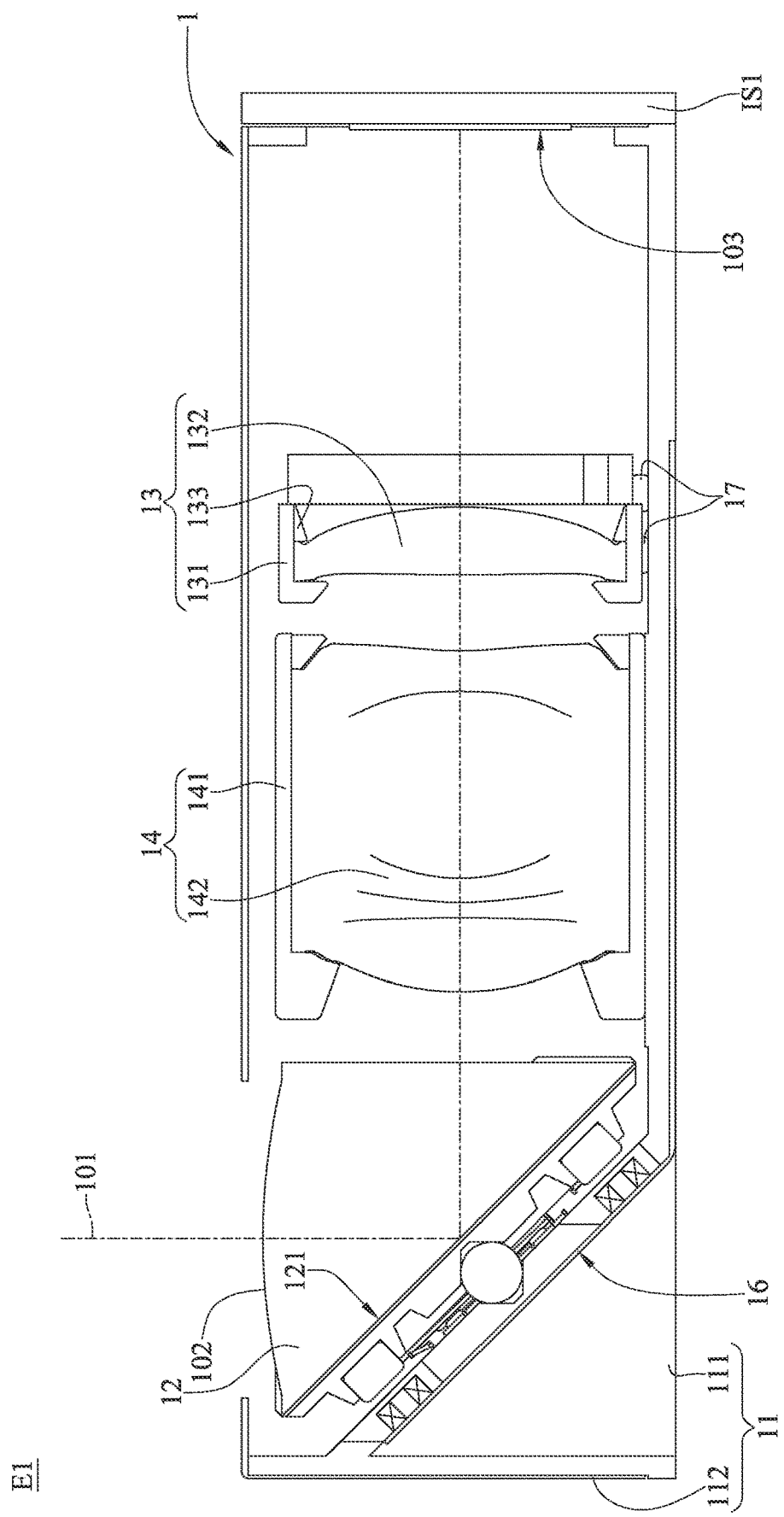
FIG. 4 is a cross-sectional view of the electronic device in FIG. 1.
Figure 5:
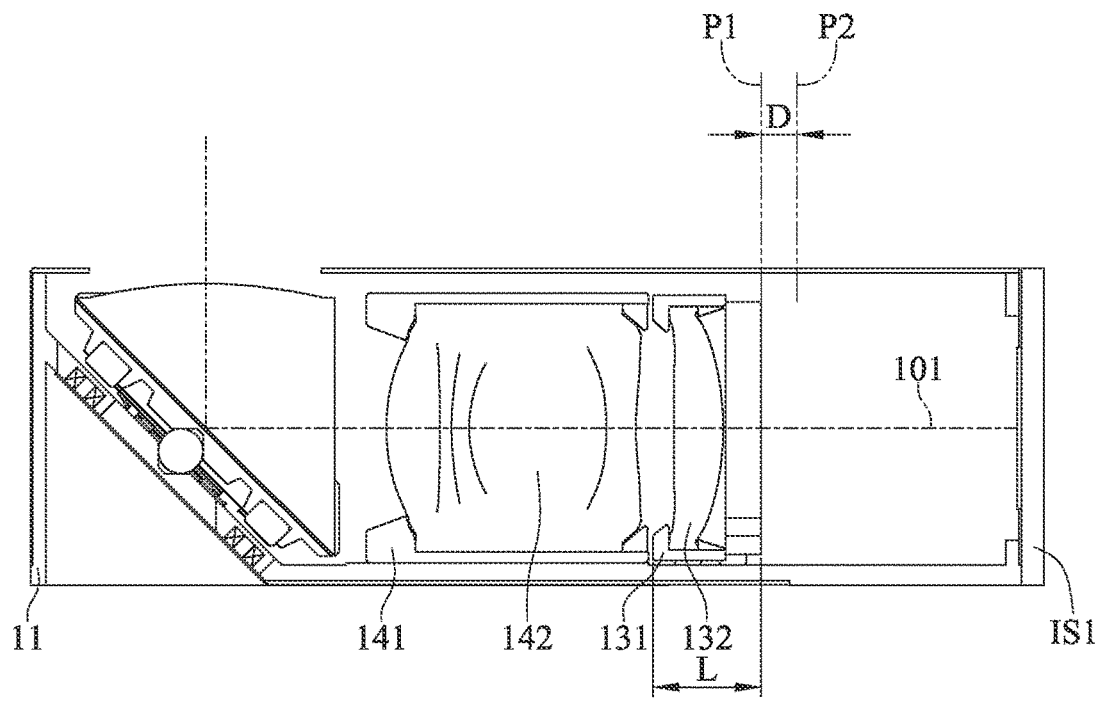
FIG. 5 is a schematic view showing the location of a camera module of the electronic device in FIG. 4 when focusing at a short distance.
Figure 6:
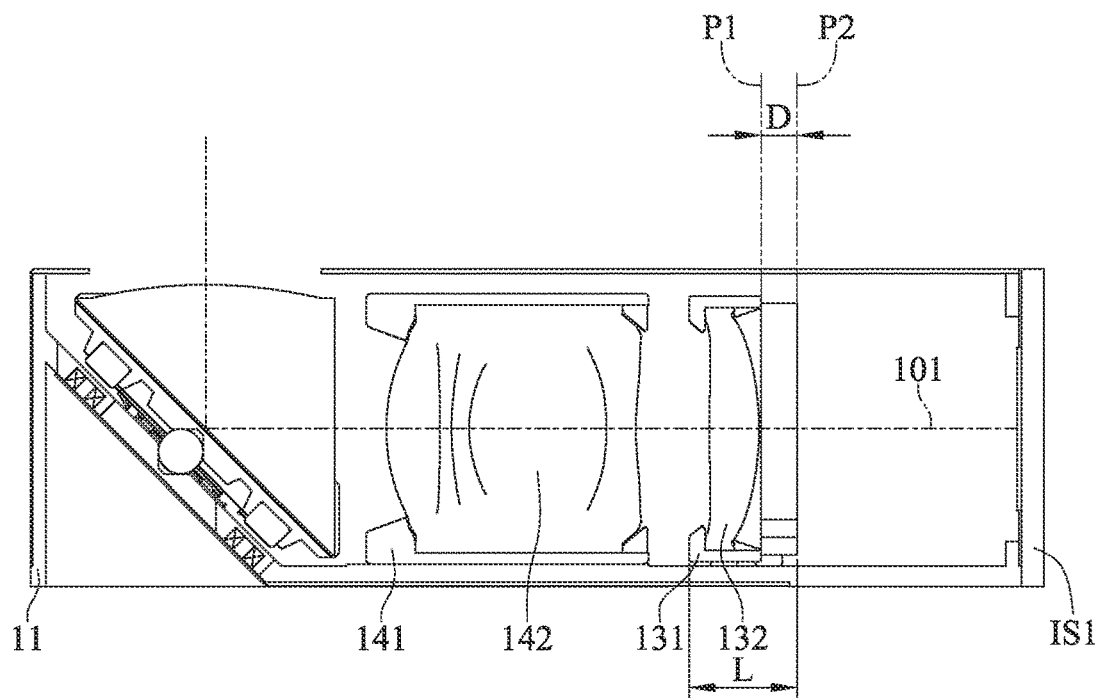
FIG. 6 is a schematic view showing the location of the camera module of the electronic device in FIG. 4 when focusing at a long distance.
Figure 7:
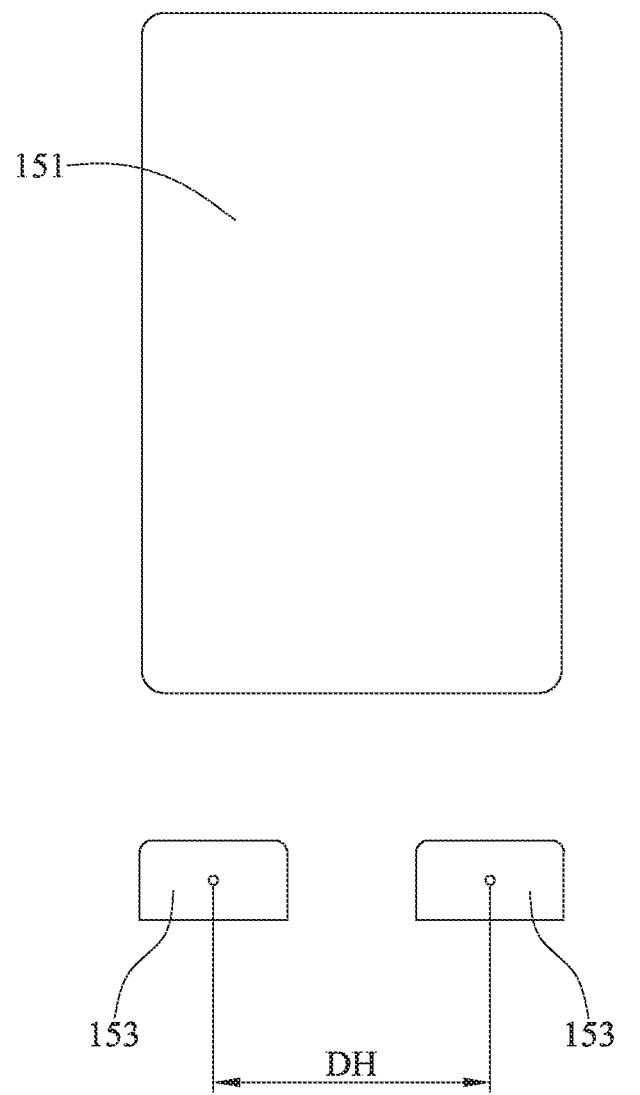
FIG. 7 is a schematic view showing the relative position between a first driving magnet and location sensing components of the electronic device in FIG. 1.

Please refer to FIG. 1 to FIG. 7, wherein FIG. 1 is a perspective view of an electronic device according to the 1st embodiment of the present disclosure, FIG. 2 is an exploded view of the electronic device in FIG. 1, FIG. 3 is another exploded view of the electronic device in FIG. 1, FIG. 4 is a cross-sectional view of the electronic device in FIG. 1, FIG. 5 is a schematic view showing the location of a camera module of the electronic device in FIG. 4 when focusing at a short distance, FIG. 6 is a schematic view showing the location of the camera module of the electronic device in FIG. 4 when focusing at a long distance, and FIG. 7 is a schematic view showing the relative position between a first driving magnet and location sensing components of the electronic device in FIG. 1.

In this embodiment, the electronic device E1 may be an electronic product such as a mobile phone. The electronic device E1 includes a main body (not shown), a camera module 1 and an image sensor IS1. The main body may include components such as a casing, a processing unit, a power supplier, and a storage unit, and the present disclosure is not limited thereto. The camera module 1 is disposed in the main body. The camera module 1 has an optical axis 101, an optical curved surface 102, and an image surface 103. The optical axis 101 passes through the optical curved surface 102 and then reaches the image surface 103. The image sensor IS1 is disposed on the image surface 103 and can be electrically connected to the processing unit of the main body.

The camera module 1 includes a fixed component 11, an optical folding component 12, a first imaging unit 13, a second imaging unit 14, a first driving device 15, a second driving device 16, a plurality of ball elements 17, and a circuit component 18. The fixed component 11 includes a base 111 and a housing 112. The housing 112 is disposed on the base 111 to form an accommodation space (not numbered) therebetween for accommodating the optical folding component 12, the first imaging unit 13, the second imaging unit 14, the first driving device 15, the second driving device 16, the ball elements 17, and the circuit component 18.

The optical folding component 12 is an integrally injection-molded plastic component and has a gate trace GT at a side thereof. The optical folding component 12 is rotatably disposed on the base 111 of the fixed component 11 via the second driving device 16. The optical curved surface 102 is an object-side surface of the optical folding component 12 and is convex in a paraxial region thereof, and the optical folding component 12 has positive refractive power through the optical curved surface 102. The optical folding component 12 has a reflection surface 121 configured to fold the optical axis 101 by 90 degrees, and the optical curved surface 102 is disposed at an object side of the reflection surface 121.

The first imaging unit 13 is located at an image side of the optical folding component 12. The first imaging unit 13 includes a first lens carrier 131, a first optical imaging lens assembly 132, and a retainer 133. The first lens carrier 131 is movably disposed on the base 111 of the fixed component 11 via the ball elements 17. The first optical imaging lens assembly 132 is accommodated in the first lens carrier 131. The retainer 133 secures the first optical imaging lens assembly 132 in the first lens carrier 131, and the retainer 133 can block light and thus be used as a light-blocking component of the first imaging unit 13.

The second imaging unit 14 is disposed between the optical folding component 12 and the first lens carrier 131 of the first imaging unit 13. The second imaging unit 14 includes a second lens carrier 141 and a second optical imaging lens assembly 142. The second lens carrier 141 is fixed on the base 111 of the fixed component 11. The second optical imaging lens assembly 142 is accommodated in the second lens carrier 141.

The first driving device 15 includes two first driving magnets 151, two first driving coils 152, and two location sensing components 153. The first driving magnets 151 are symmetrically disposed about the optical axis 101 on two opposite sides of the first lens carrier 131. The first driving coils 152 are symmetrically disposed about the optical axis 101 on the circuit component 18 and located at two opposite sides of the accommodation space, and the first driving coils 152 respectively correspond to the first driving magnets 151. The first driving coils 152 and the first driving magnets 151 of the first driving device 15 can have electromagnetic interaction therebetween to generate an electromagnetic force for moving the first lens carrier 131 along the optical axis 101 with respect to the fixed component 11. The movement of the first lens carrier 131 can drive the first optical imaging lens assembly 132 accommodated therein to move between the location P1 (as shown in FIG. 5) for short focusing distance and the location P2 (as shown in FIG. 6) for long focusing distance along the optical axis 101 with respect to the fixed component 11. The location sensing components 153 are symmetrically disposed about the optical axis 101 at two opposite sides of the base 111, and the location sensing components 153 are located respectively corresponding to the first lens carrier 131 and adjacent to the first driving magnets 151 so as to sense the locations of the first driving magnets 151.

The second driving device 16 includes four second driving magnets 161, four second driving coils 162, an optical folding component carrier 163, a supporting component 164, and an elastic connection component 165. The second driving magnets 161 are disposed on the optical folding component carrier 163. The second driving coils 162 are disposed on the circuit component 18 and are located in the accommodation space, and the second driving coils 162 respectively correspond to the second driving magnets 161. The optical folding component carrier 163 is disposed on the base 111 via the supporting component 164 and the elastic connection component 165, and the optical folding component 12 is disposed on the optical folding component carrier 163. The supporting component 164 may be spherical and disposed between the base 111 and the optical folding component carrier 163. The optical folding component 12 and the optical folding component carrier 163 are rotatable with respect to the base 111 of the fixed component 11 by abutting on the supporting component 164 so as to rotate the reflection surface 121 for adjusting the direction of the optical axis 101. The second driving coils 162 and the second driving magnets 161 of the second driving device can have electromagnetic interaction therebetween to generate an electromagnetic force for rotating the optical folding component carrier 163 and the optical folding component 12 disposed thereon with respect to the fixed component 11. The elastic connection component 165 is disposed between the base 111 and the optical folding component carrier 163. The elastic connection component 165 can have an elastic restoring force to restore the rotated optical folding component carrier 163 to its original position.

The ball elements 17 are spherical and disposed between the first lens carrier 131 and the base 111 of the fixed component 11, and the first lens carrier 131 is supported by the ball elements 17 so as to achieve the abovementioned movable configuration thereof with respect to the fixed component 11.

The circuit component 18 is disposed on the base 111 and may be electrically connected to the processing unit and the power supplier of the main body. The circuit component 18 may be further electrically connected to the first driving coils 152 and the second driving coils 162 so as to provide power for inducing the electromagnetic interaction between the first driving coils 152 and the second driving coils 162.

When the number of lens elements of the first optical imaging lens assembly 132 is N1, the number of lens elements of the second optical imaging lens assembly 142 is N2, and the total number of lens elements of the camera module 1 is Nt, the following conditions are satisfied: N1=1; N2=3; Nt=5; N1<N2; and N1+N2<Nt. Please be noted that the total lens elements of the camera module 1 include not only the single lens element of the first optical imaging lens assembly 132 and the three lens elements of the second optical imaging lens assembly 142, but also the optical folding component 12 with positive refractive power. Please also be noted that each lens element in the first optical imaging lens assembly 132 and the second optical imaging lens assembly 142 is only shown by partial contour lines in the drawings, and the shape of each lens element in the drawings is not intended to restrict the present disclosure.

When a distance in parallel with the optical axis 101 between the geometric center points of two of the location sensing components 153 is DH, and a distance by which the first lens carrier 131 is movable along the optical axis 101 with respect to the fixed component 11 (i.e., the distance between the position P1 and the position P2) is D, the following conditions are satisfied: DH=1.219 [mm]; D=0.8 [mm]; and DH/D=1.52. Please be noted that the viewing angle of FIG. 7 is viewed from the direction AA in FIG. 2; in this viewing angle, one of the first driving magnets 151 cannot be seen because it is blocked by the other one of the first driving magnets 151, while one of the location sensing components 153 can be seen because it is not blocked by the other one of the location sensing components 153.

When a maximum field of view of the camera module 1 is FOV, the following condition is satisfied: FOV=18.6 [deg.].

When a total length of the first lens carrier 131 along the optical axis 101 is L, the following condition is satisfied: L=2.403 [mm].

An imaging light (not shown) generated near to or far from the electronic device E1 can enter the optical folding component 12 via the optical curved surface 102 and then sequentially pass through the second optical imaging lens assembly 142 and the first optical imaging lens assembly 132 after being reflected by the reflection surface 121 along the optical axis 101. Since the first lens carrier 131 can be moved between the second lens carrier 141 and the image sensor IS1 with respect to the fixed component 11, the imaging light from near or far can be converged on the image surface 103 by adjusting the location of the first optical imaging lens assembly 132 so as to generate optical imaging information. The image sensor IS1 can convert the optical imaging information into electrical imaging information and transmit the electrical imaging information to the processing unit for subsequent image processing.

2nd Embodiment

Figure 8:
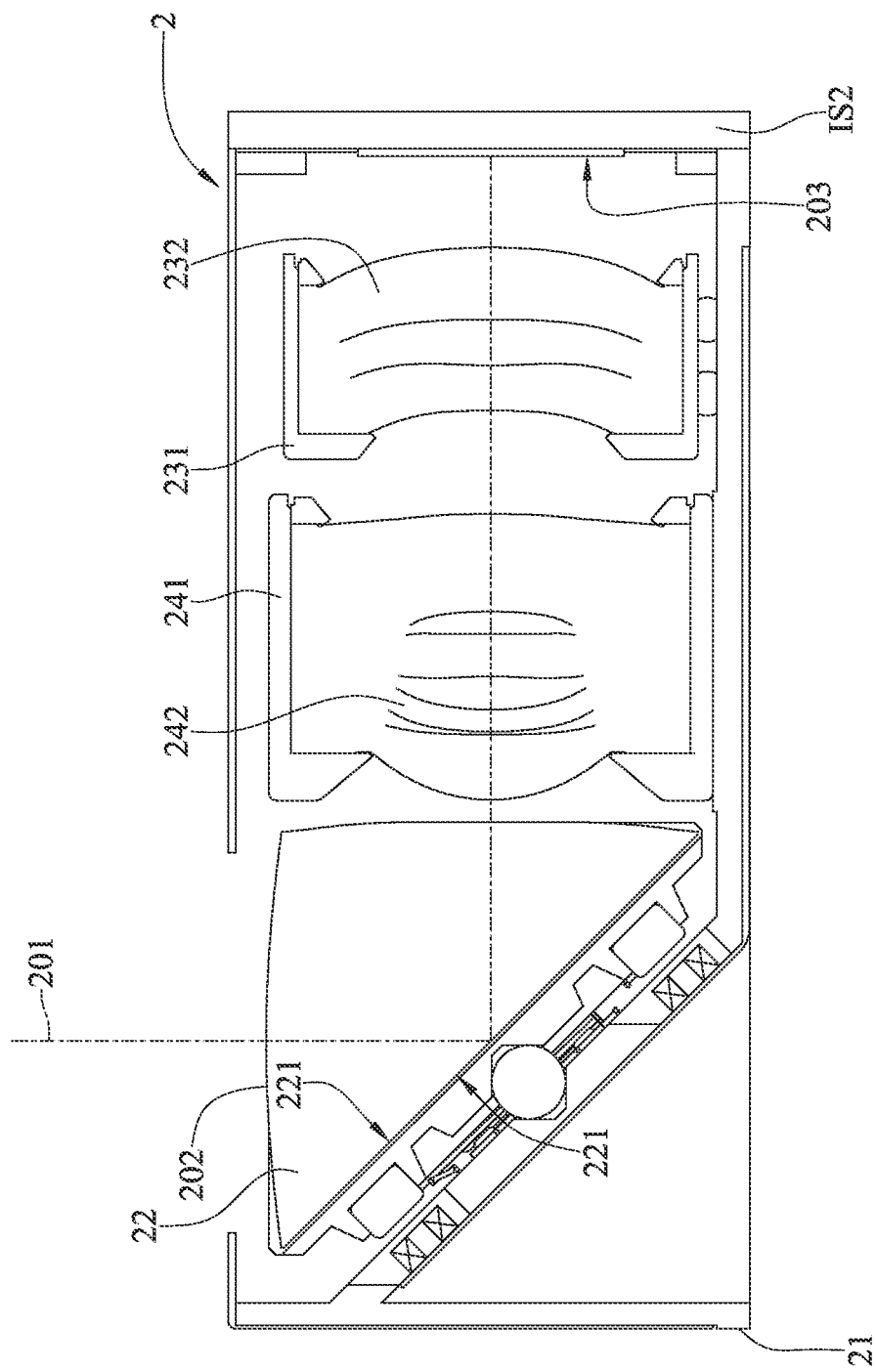
FIG. 8 is a cross-sectional view of an electronic device according to the 2nd embodiment of the present disclosure.
Figure 9:
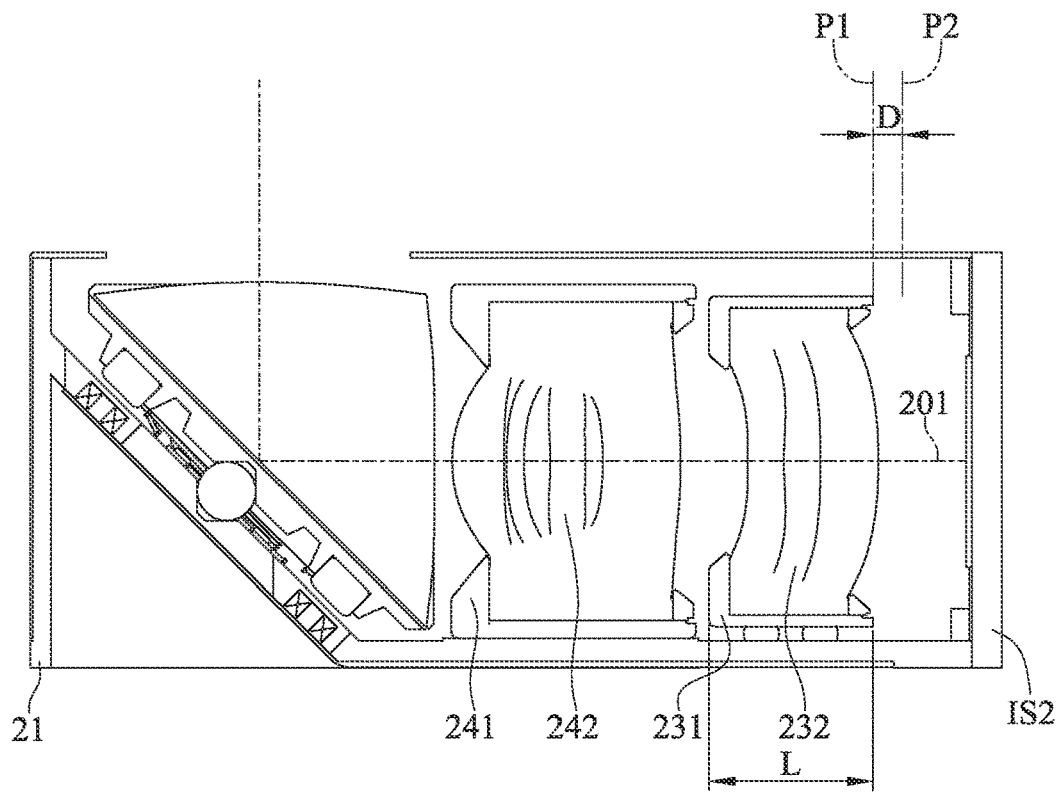
FIG. 9 is a schematic view showing the location of a camera module of the electronic device in FIG. 8 when focusing at a short distance.
Figure 10:
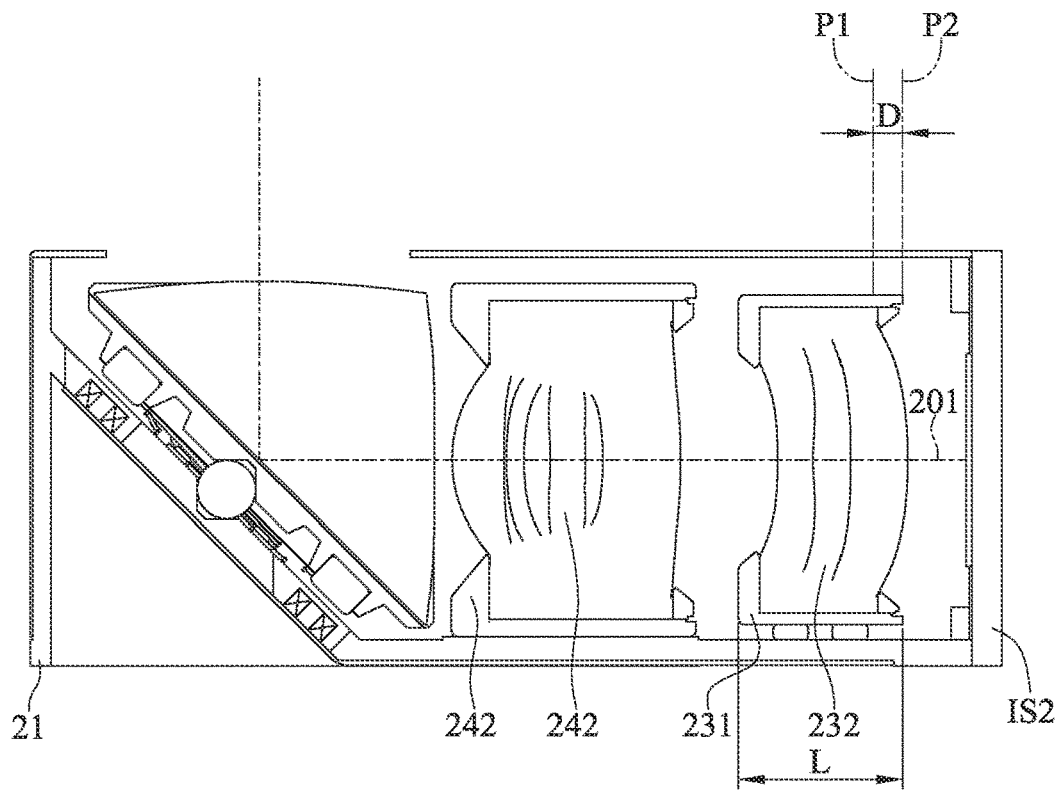
FIG. 10 is a schematic view showing the location of the camera module of the electronic device in FIG. 8 when focusing at a long distance.
Figure 11:
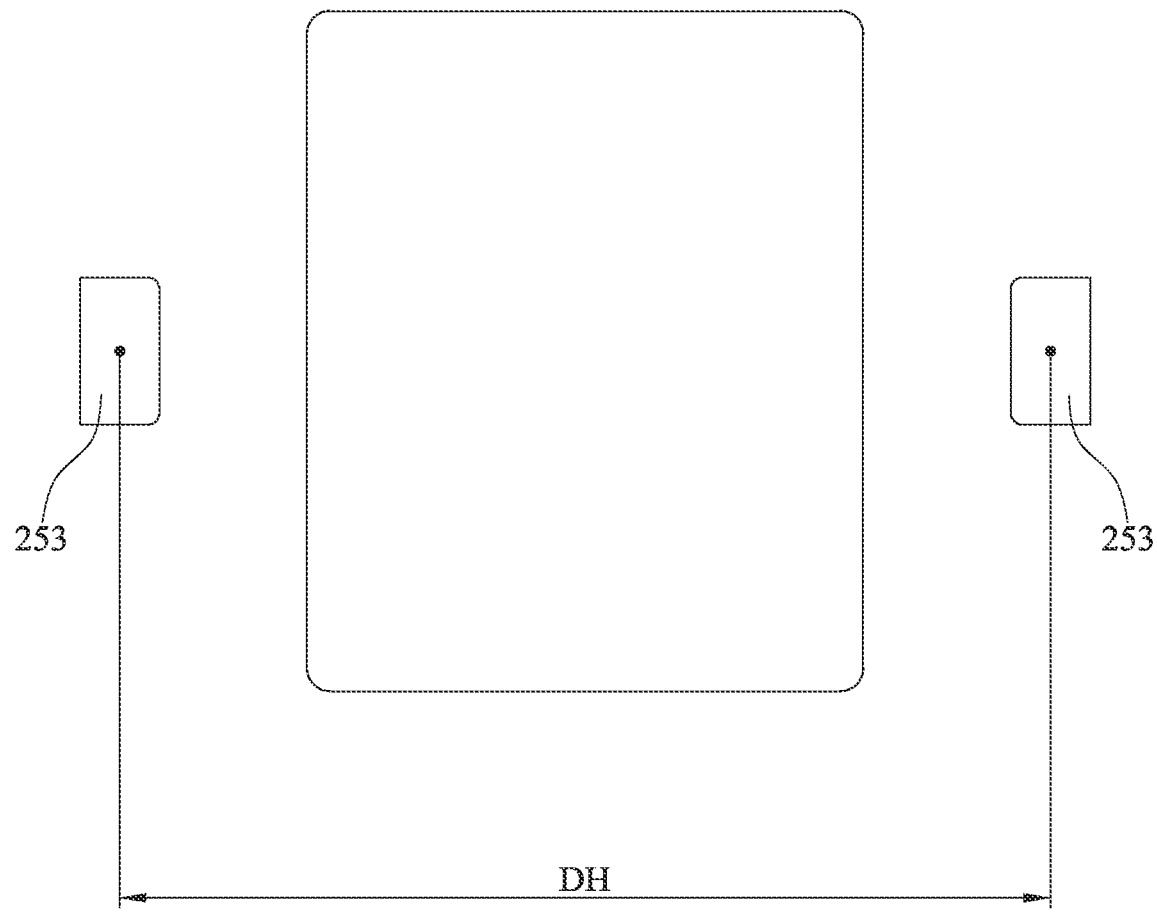
FIG. 11 is a schematic view showing the relative position between a first driving magnet and location sensing components of the electronic device in FIG. 8.

Please refer to FIG. 8 to FIG. 11, wherein FIG. 8 is a cross-sectional view of an electronic device according to the 2nd embodiment of the present disclosure, FIG. 9 is a schematic view showing the location of a camera module of the electronic device in FIG. 8 when focusing at a short distance, FIG. 10 is a schematic view showing the location of the camera module of the electronic device in FIG. 8 when focusing at a long distance, and FIG. 11 is a schematic view showing the relative position between a first driving magnet and location sensing components of the electronic device in FIG. 8. Please be noted that only differences between this and the abovementioned embodiments will be described hereinafter.

When the number of lens elements of the first optical imaging lens assembly 232 is N1, the number of lens elements of the second optical imaging lens assembly 242 is N2, and the total number of lens elements of the camera module 2 is Nt, the following conditions are satisfied: N1=2; N2=4; Nt=7; N1<N2; and N1+N2<Nt. Please be noted that the total lens elements of the camera module 2 include not only the two lens elements of the first optical imaging lens assembly 232 and the four lens elements of the second optical imaging lens assembly 242, but also the optical folding component 22 with positive refractive power. Please also be noted that each lens element in the first optical imaging lens assembly 232 and the second optical imaging lens assembly 242 is only shown by partial contour lines in the drawings, and the shape of each lens element in the drawings is not intended to restrict the present disclosure.

When a distance in parallel with the optical axis 201 between the geometric center points of two of the location sensing components 253 is DH, and a distance by which the first lens carrier 231 is movable along the optical axis 201 with respect to the fixed component 21 (i.e., the distance between the position P1 and the position P2) is D, the following conditions are satisfied: DH=4.1 [mm]; D=0.5 [mm]; and DH/D=8.2.

When a maximum field of view of the camera module 2 is FOV, the following condition is satisfied: FOV=21.8 [deg.].

When a total length of the first lens carrier 231 along the optical axis 201 is L, the following condition is satisfied: L=2.775 [mm].

An imaging light (not shown) generated near to or far from the electronic device E2 can enter the optical folding component 22 via the optical curved surface 202 and then sequentially pass through the second optical imaging lens assembly 242 and the first optical imaging lens assembly 232 after being reflected by the reflection surface 221 along the optical axis 201. Since the first lens carrier 231 can be moved between the second lens carrier 241 and the image sensor IS2 with respect to the fixed component 21, the imaging light from near or far can be converged on the image surface 203 by adjusting the location of the first optical imaging lens assembly 232 so as to generate optical imaging information. The image sensor IS2 can convert the optical imaging information into electrical imaging information for subsequent image processing.

3rd Embodiment

Figure 12:
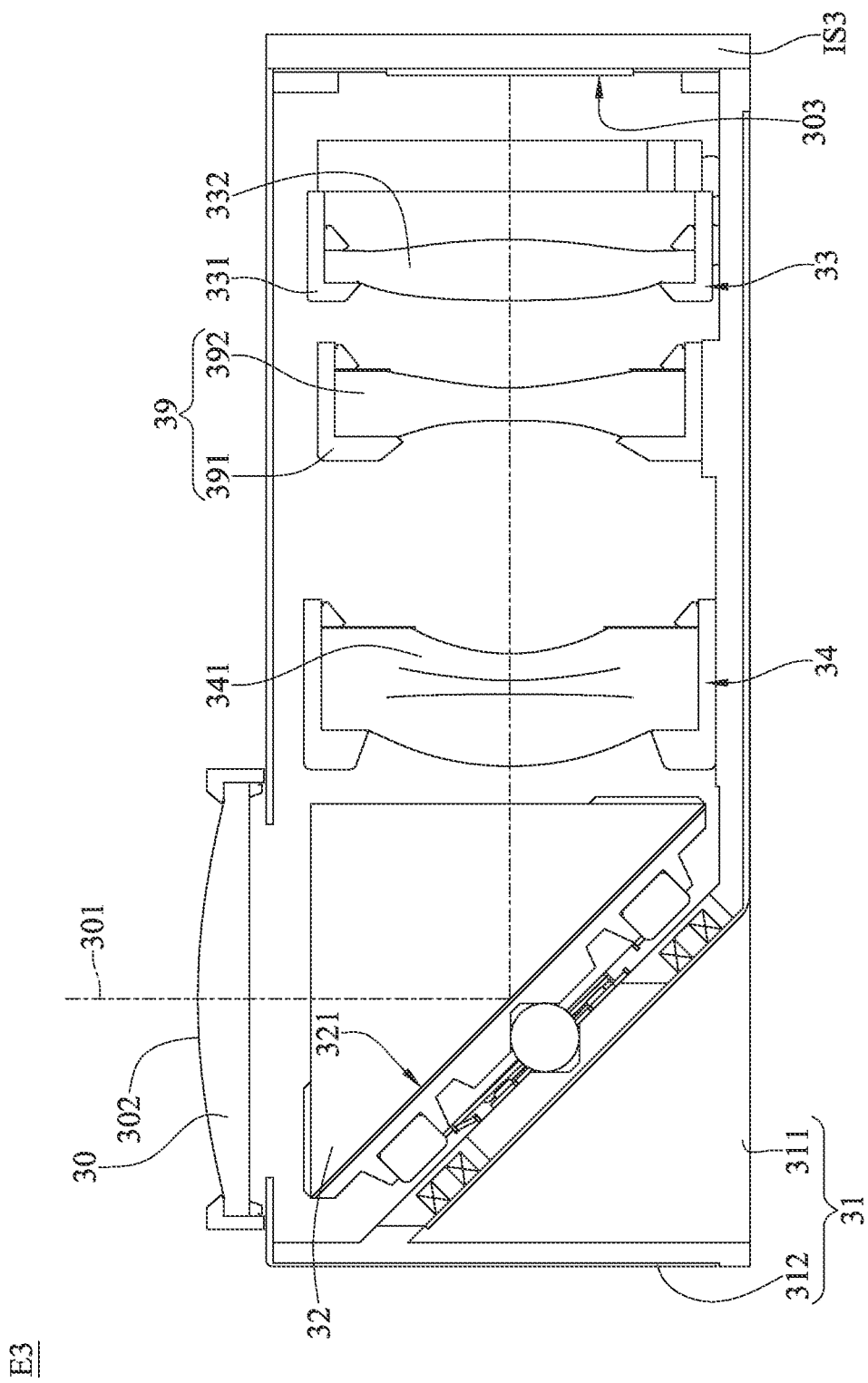
FIG. 12 is a cross-sectional view of an electronic device according to the 3rd embodiment of the present disclosure.
Figure 13:
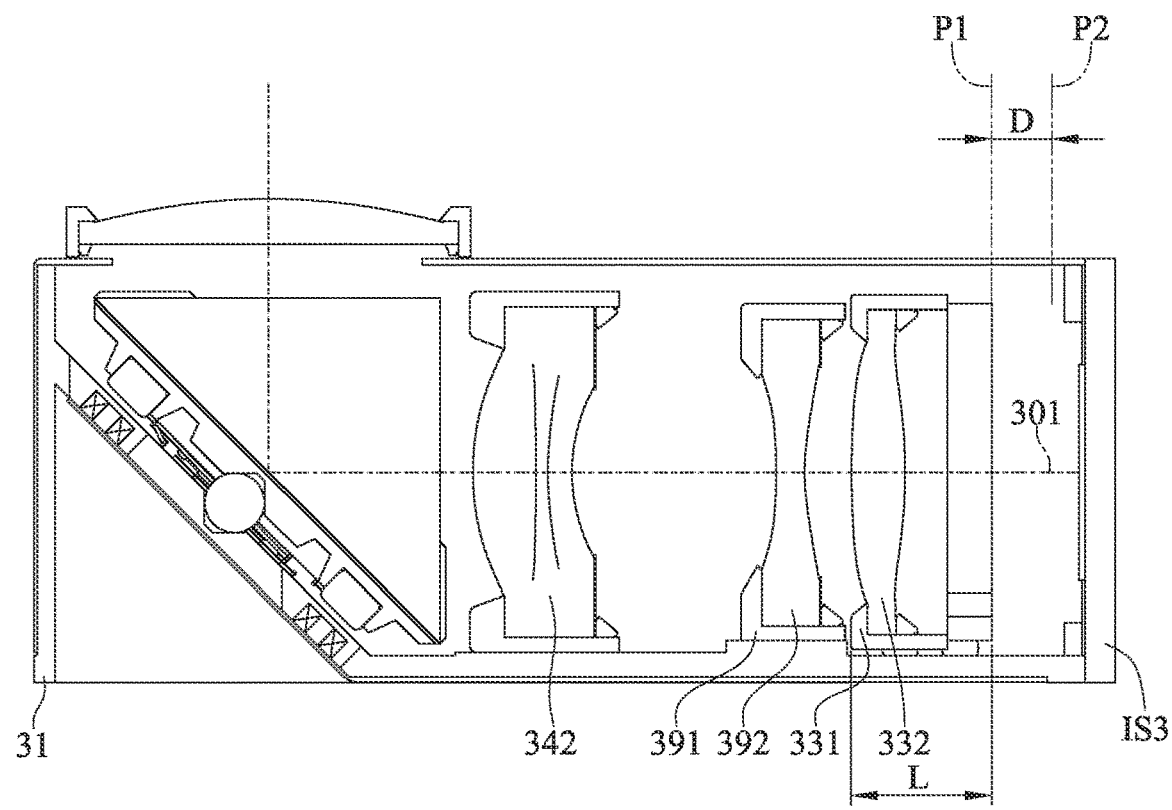
FIG. 13 is a schematic view showing the location of a camera module of the electronic device in FIG. 12 when focusing at a short distance.
Figure 14:
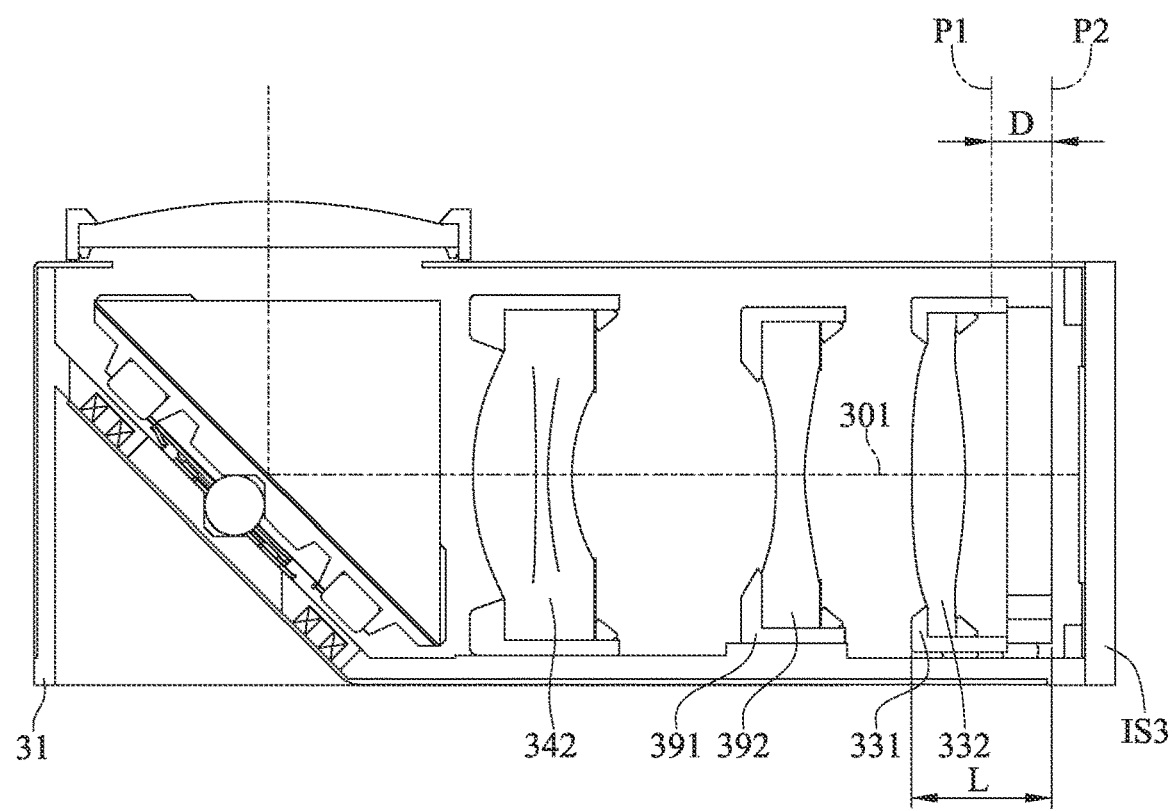
FIG. 14 is a schematic view showing the location of the camera module of the electronic device in FIG. 12 when focusing at a long distance.
Figure 15:
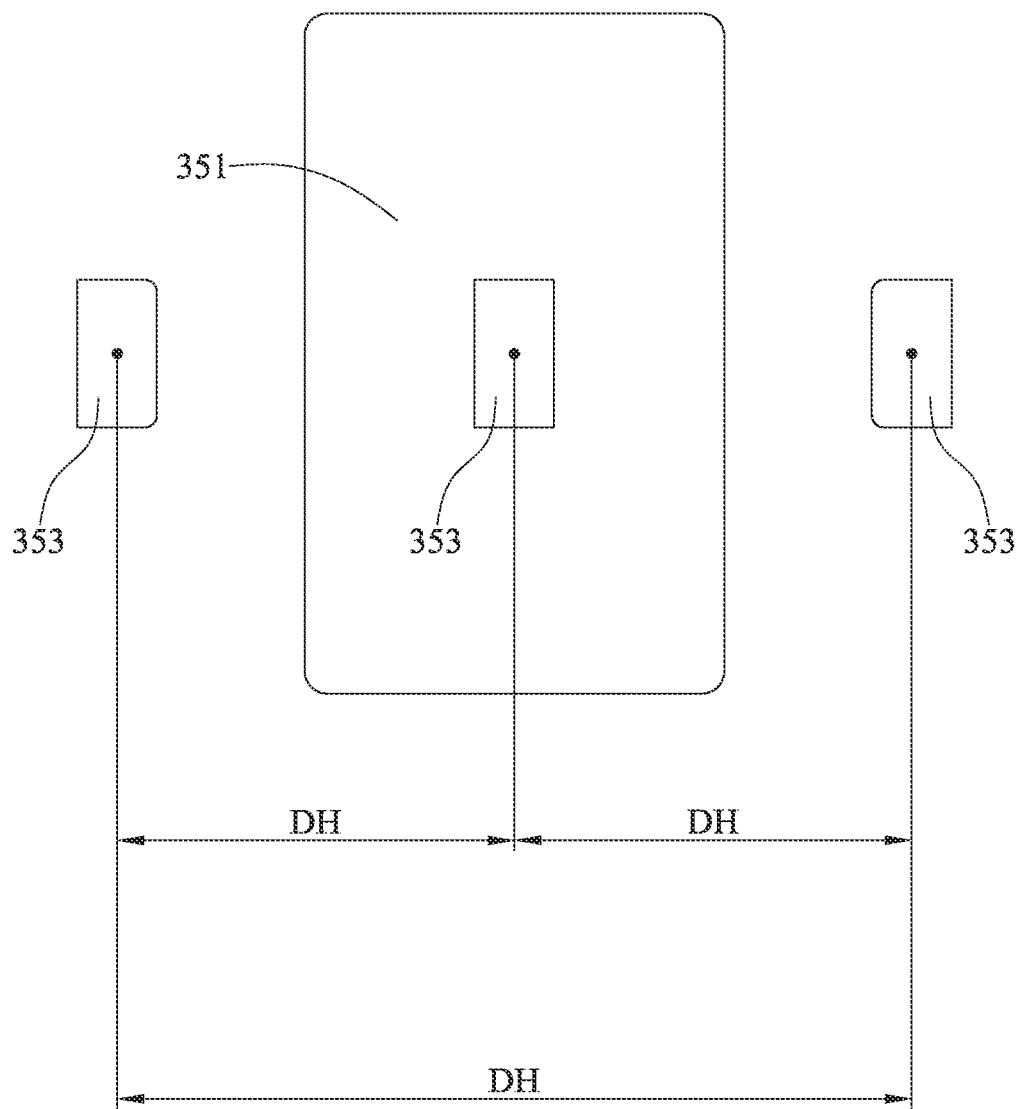
FIG. 15 is a schematic view showing the relative position between a first driving magnet and location sensing components of the electronic device in FIG. 12.

Please refer to FIG. 12 to FIG. 15, wherein FIG. 12 is a cross-sectional view of an electronic device according to the 3rd embodiment of the present disclosure, FIG. 13 is a schematic view showing the location of a camera module of the electronic device in FIG. 12 when focusing at a short distance, FIG. 14 is a schematic view showing the location of the camera module of the electronic device in FIG. 12 when focusing at a long distance, and FIG. 15 is a schematic view showing the relative position between a first driving magnet and location sensing components of the electronic device in FIG. 12. Please be noted that only differences between this and the abovementioned embodiments will be described hereinafter.

The camera module 3 further includes a positive lens element 30 and a third imaging unit 39. In this embodiment, the optical curved surface 302 is an object-side surface of the positive lens element 30 rather than any surface of the optical folding component 32. The optical curved surface 302 is convex in a paraxial region thereof, and the positive lens element 30 has positive refractive power through the optical curved surface 302. The camera module 3 further includes a fourth lens carrier (not numbered) disposed outside the housing 312. The positive lens element 30 is disposed at an object side of the optical folding component 32 and accommodated in the fourth lens carrier, and thus it can be considered that the positive lens element 30 and the fourth lens carrier as a fourth imaging unit (not numbered).

The third imaging unit 39 is disposed between the first lens carrier 331 of the first imaging unit 33 and the second lens carrier 341 of the second imaging unit 34. The third imaging unit 39 includes a third lens carrier 391 and a third optical imaging lens assembly 392. The third lens carrier 391 is fixed on the base 311 of the fixed component 31. The third optical imaging lens assembly 392 is accommodated in the third lens carrier 391.

The number of the location sensing components 353 is three. The location sensing components 353 are located correspond to the first lens carrier 331 and adjacent to three sides of the first driving magnet 351 so as to sense the location of the first driving magnet 351.

When the number of lens elements of the first optical imaging lens assembly 332 is N1, the number of lens elements of the second optical imaging lens assembly 342 is N2, the number of lens elements of the third optical imaging lens assembly 392 is N3, and the total number of lens elements of the camera module 3 is Nt, the following conditions are satisfied: N1=1; N2=2; N3=1; Nt=5; N1<N2; and N1+N2<Nt. Please be noted that the total lens elements of the camera module 3 include not only the single lens element of the first optical imaging lens assembly 332, the two lens elements of the second optical imaging lens assembly 342, and the single lens element of the third optical imaging lens assembly 392, but also the positive lens element 30 with positive refractive power. Please also be noted that each lens element in the first optical imaging lens assembly 332, the second optical imaging lens assembly 342, and the third optical imaging lens assembly 392 is only shown by partial contour lines in the drawings, and the shape of each lens element in the drawings is not intended to restrict the present disclosure.

When a distance in parallel with the optical axis 301 between the geometric center points of two of the location sensing components 353 is DH, and a distance by which the first lens carrier 331 is movable along the optical axis 301 with respect to the fixed component 31 (i.e., the distance between the position P1 and the position P2) is D, the following conditions are satisfied: DH=1.75 and 3.5 [mm]; D=1 [mm]; and DH/D=1.75 and 3.5.

When a maximum field of view of the camera module 3 is FOV, the following condition is satisfied: FOV=28.3 [deg.].

When a total length of the first lens carrier 331 along the optical axis 301 is L, the following condition is satisfied: L=2.343 [mm].

An imaging light (not shown) generated near to or far from the electronic device E3 can enter the optical folding component 32 via the optical curved surface 302 of the positive lens element 30 and then sequentially pass through the second optical imaging lens assembly 342, the third optical imaging lens assembly 392, and the first optical imaging lens assembly 332 after being reflected by the reflection surface 321 along the optical axis 301. Since the first lens carrier 331 can be moved between the third lens carrier 391 and the image sensor IS3 with respect to the fixed component 31, the imaging light from near or far can be converged on the image surface 303 by adjusting the location of the first optical imaging lens assembly 332 so as to generate optical imaging information. The image sensor IS2 can convert the optical imaging information into electrical imaging information for subsequent image processing.

4th Embodiment

Figure 16:
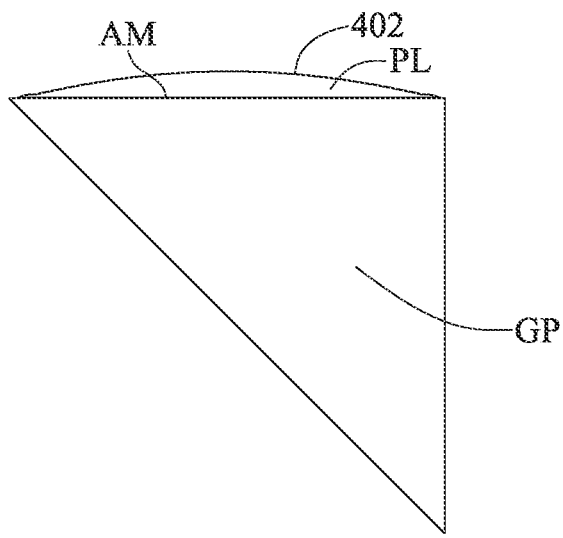
FIG. 16 is a side view of an optical folding component of an electronic device according to the 4th embodiment of the present disclosure.

Please refer to FIG. 16, which is a side view of an optical folding component of an electronic device according to the 4th embodiment of the present disclosure. Please be noted that only differences between this and the abovementioned embodiments will be described hereinafter. In this embodiment, a specific aspect of an optical folding component is provided and can be applied to any one camera module of the abovementioned embodiments.

The optical folding component 42 is an assembly in which a plastic lens element PL is attached to a glass prism GP through an adhesive material AM. In this embodiment, the optical curved surface 402 is an object-side surface of the plastic lens element PL. The optical curved surface 402 is convex in a paraxial region thereof, and the optical folding component 42 has positive refractive power through the optical curved surface 402.

5th Embodiment

Figure 17:
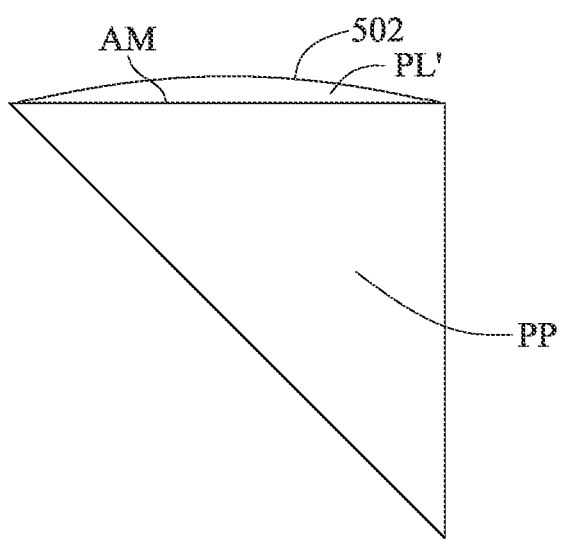
FIG. 17 is a side view of an optical folding component of an electronic device according to the 5th embodiment of the present disclosure.

Please refer to FIG. 17, which is a side view of an optical folding component of an electronic device according to the 5th embodiment of the present disclosure. Please be noted that only differences between this and the abovementioned embodiments will be described hereinafter. In this embodiment, a specific aspect of an optical folding component is provided and can be applied to any one camera module of the abovementioned embodiments.

The optical folding component 52 is an assembly in which a plastic lens element PL' is attached to a plastic prism PP through an adhesive material AM. In this embodiment, the optical curved surface 502 is an object-side surface of the plastic lens element PL'. The optical curved surface 502 is convex in a paraxial region thereof, and the optical folding component 52 has positive refractive power through the optical curved surface 502.

6th Embodiment

Figure 18:
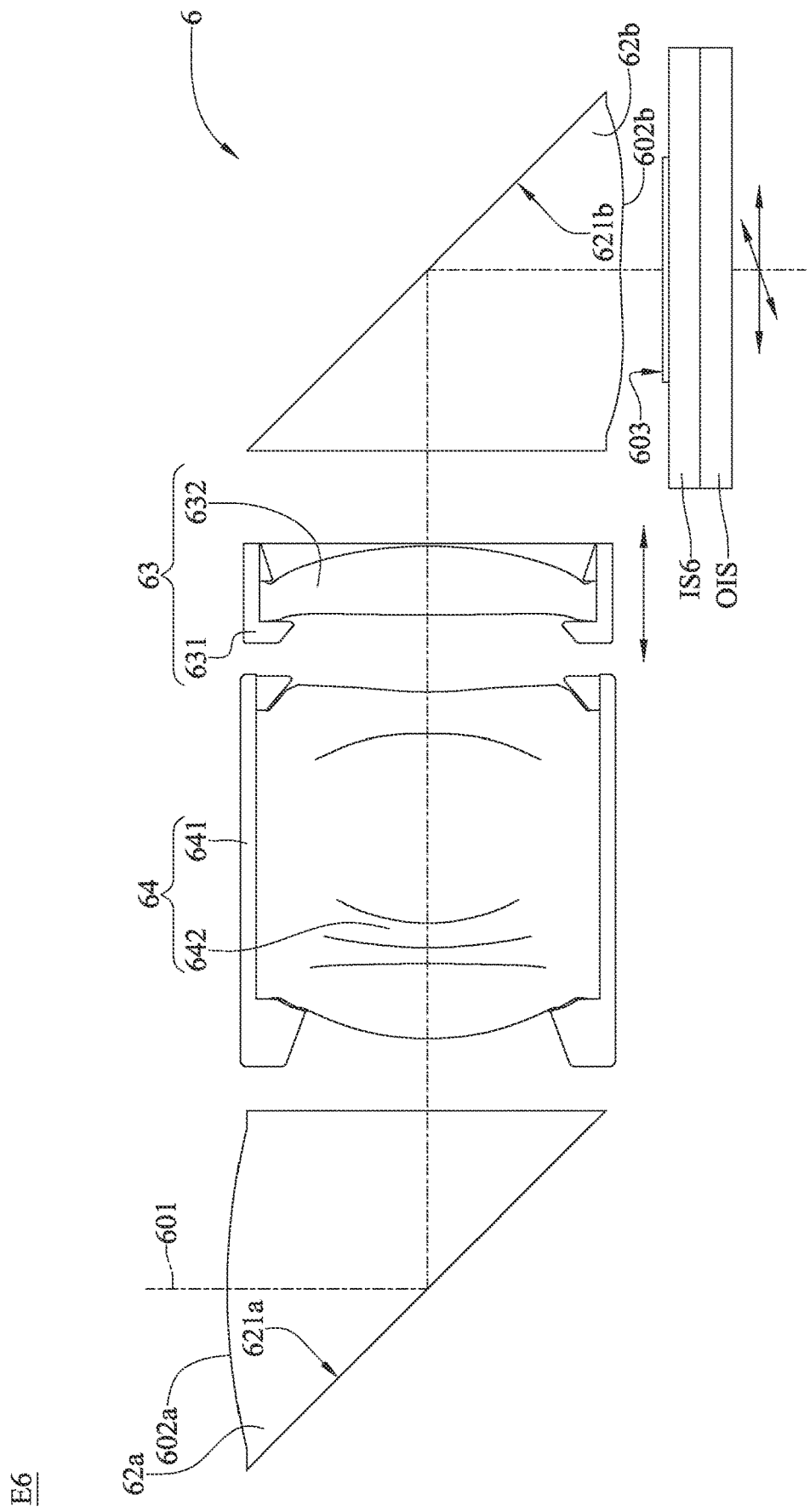
FIG. 18 is a cross-sectional view of an electronic device according to the 6th embodiment of the present disclosure.

Please refer to FIG. 18, which is a cross-sectional view of an electronic device according to the 6th embodiment of the present disclosure. Please be noted that only differences between this and the abovementioned embodiments will be described hereinafter.

The electronic device E6 includes a main body (not shown), a camera module 6, an image sensor IS6, and an optical image stabilization driver OIS. The camera module 6 is disposed in the main body. The camera module 6 has an optical axis 601, an object-side optical curved surface 602a, an image-side optical curved surface 602b, and an image surface 603. The optical axis 601 passes through the object-side optical curved surface 602a and the image-side optical curved surface 602b and then reaches the image surface 603. The image sensor IS6 is disposed on the image surface 603. The optical image stabilization driver OIS is disposed on the image sensor IS6 so as to move the image sensor IS6 on a plane in parallel with the image surface 603.

The camera module 6 includes a fixed component (not shown in this embodiment), an object-side optical folding component 62a, an image-side optical folding component 62b, a first imaging unit 63, a second imaging unit 64, a first driving device (not shown in this embodiment), a plurality of ball elements (not shown in this embodiment), and a circuit component (not shown in this embodiment). The fixed component forms an accommodation space for accommodating the object-side optical folding component 62a, the image-side optical folding component 62b, the first imaging unit 63, the second imaging unit 64, the first driving device, the ball elements, and the circuit component.

The object-side optical folding component 62a and the image-side optical folding component 62b are fixed on the fixed component and respectively disposed at an object side of the second imaging unit 64 and an image side of the first imaging unit 63. The object-side optical curved surface 602a is an object-side surface of the object-side optical folding component 62a and is convex in a paraxial region thereof, and the object-side optical folding component 62a has positive refractive power through the object-side optical curved surface 602a. The object-side optical folding component 62a has an object-side reflection surface 621a that is located at an image side of the object-side optical curved surface 602a and configured to fold the optical axis 601 by 90 degrees.

The image-side optical curved surface 602b is an image-side surface of the image-side optical folding component 62b and is convex in a paraxial region thereof, and the image-side optical folding component 62b has positive refractive power through the image-side optical curved surface 602b. The image-side optical folding component 62b has an image-side reflection surface 621b that is located at an object side of the image-side optical curved surface 602b and configured to further fold the optical axis 601 by 90 degrees. Please be noted that since the object-side optical folding component 62a and the image-side optical folding component 62b are immovable with respect to the fixed component, the camera module 6 of this embodiment may not include any driving device for driving the optical folding components.

When the number of lens elements of the first optical imaging lens assembly 632 is N1, the number of lens elements of the second optical imaging lens assembly 642 is N2, and the total number of lens elements of the camera module 6 is Nt, the following conditions are satisfied: N1=1; N2=3; Nt=6; N1<N2; and N1+N2<Nt. Please be noted that the total lens elements of the camera module 6 include not only the single lens element of the first optical imaging lens assembly 632 and the three lens elements of the second optical imaging lens assembly 642, but also the object-side optical folding component 62a with positive refractive power and the image-side optical folding component 62b with positive refractive power. Please also be noted that each lens element in the first optical imaging lens assembly 632 and the second optical imaging lens assembly 642 is only shown by partial contour lines in the drawings, and the shape of each lens element in the drawings is not intended to restrict the present disclosure.

When a maximum field of view of the camera module 6 is FOV, the following condition is satisfied: FOV=18.0 [deg.].

An imaging light (not shown) generated near to or far from the electronic device E6 can enter the object-side optical folding component 62a via the object-side optical curved surface 602a, then sequentially pass through the second optical imaging lens assembly 642 and the first optical imaging lens assembly 632 after being reflected by the object-side reflection surface 621a, and then enter the image-side optical folding component 62b to be reflected towards the image sensor IS6 by the image-side reflection surface 621b along the optical axis 601. Since the first lens carrier 631 can be moved between the second lens carrier 641 and the image-side optical folding component 62b with respect to the fixed component, the imaging light from near or far can be converged on the image surface 603 by adjusting the location of the first optical imaging lens assembly 632 so as to generate optical imaging information. The image sensor IS6 can stably receive the optical imaging information by being driven by the optical image stabilization driver OIS and convert the optical imaging information into electrical imaging information for subsequent image processing. Please be noted that the driving manner of the optical image stabilization driver OIS is not limited to the example in the specification or the drawings of the present disclosure.

7th Embodiment

Figure 19:
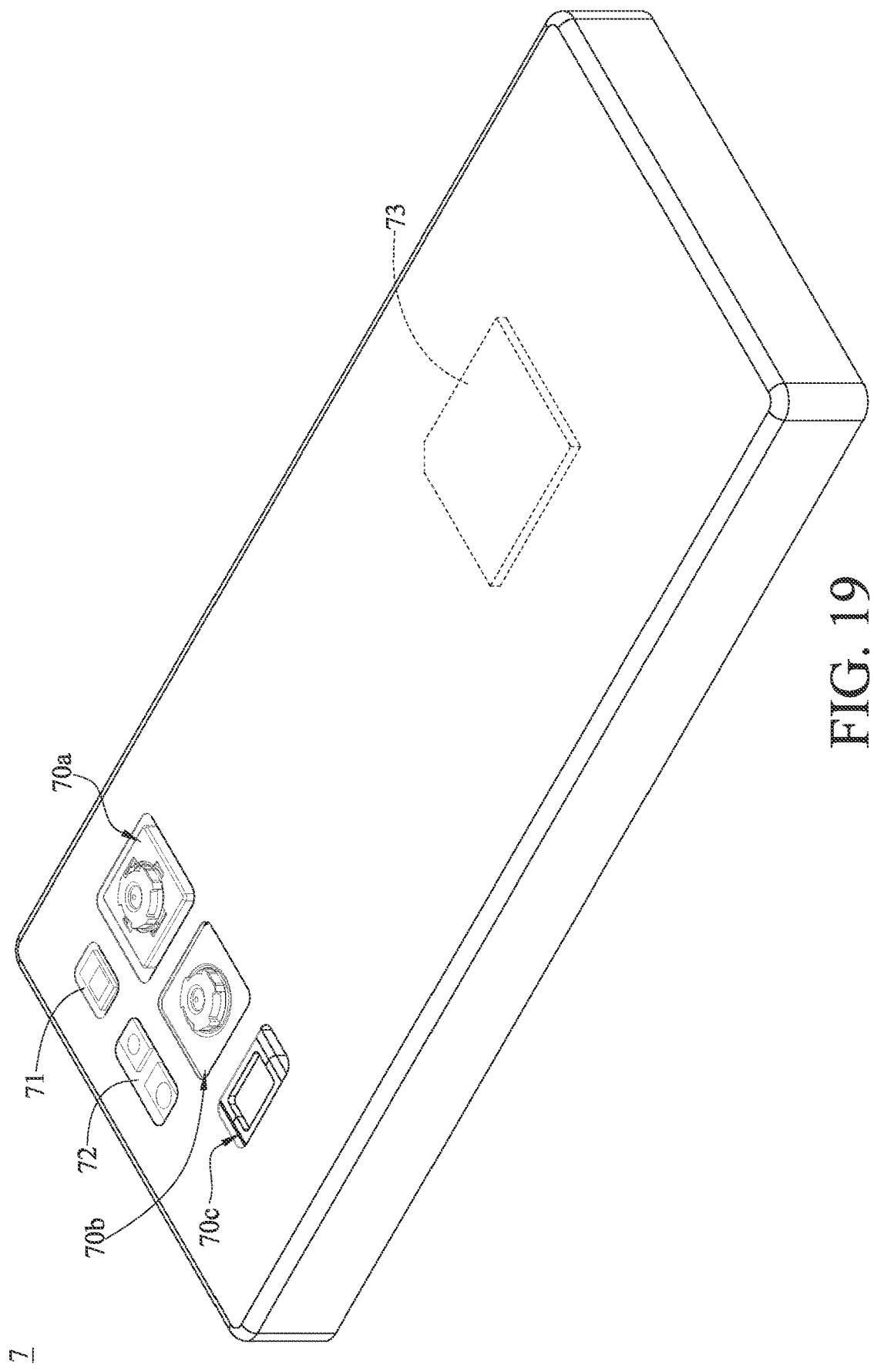
FIG. 19 is a perspective view of an electronic device according to the 7th embodiment of the present disclosure.
Figure 20:
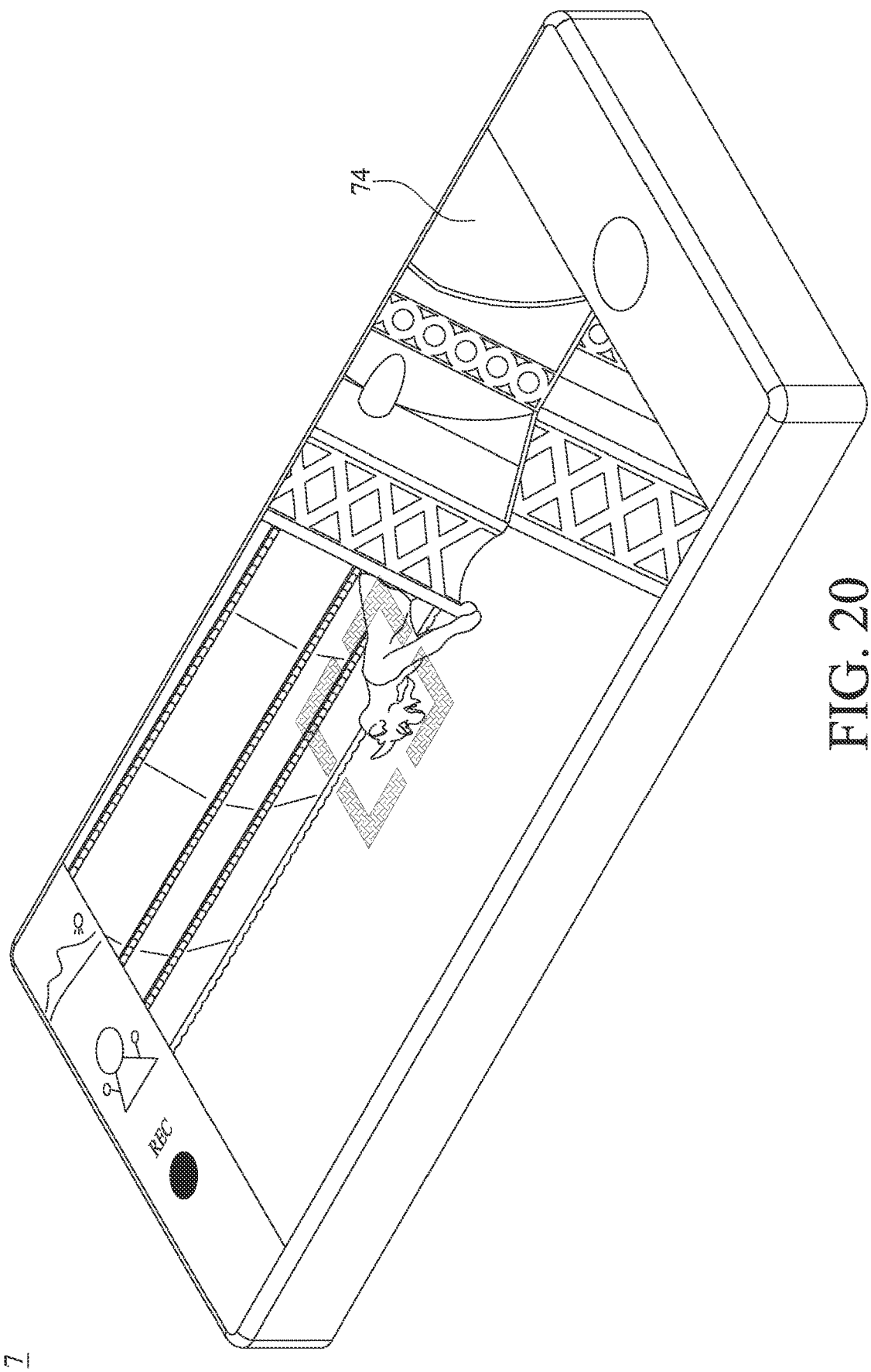
FIG. 20 is another perspective view of the electronic device in FIG. 19.

Please refer to FIG. 19 and FIG. 20, wherein FIG. 19 is a perspective view of an electronic device according to the 7th embodiment of the present disclosure, and FIG. 20 is another perspective view of the electronic device in FIG. 19.

In this embodiment, an electronic device 7 is a smartphone including a plurality of camera modules, a flash module 71, a focus assist module 72, an image signal processor 73, a display module (user interface) 74 and an image software processor (not shown).

The camera modules include an ultra-wide-angle camera module 70a, a high pixel camera module 70b and a telephoto camera module 70c. The camera module 1 disclosed in the 1st embodiment is taken as the telephoto camera module 70c, but the present disclosure is not limited thereto. Camera modules disclosed in other embodiments can also be taken as the telephoto camera module 70c.

Figure 21:
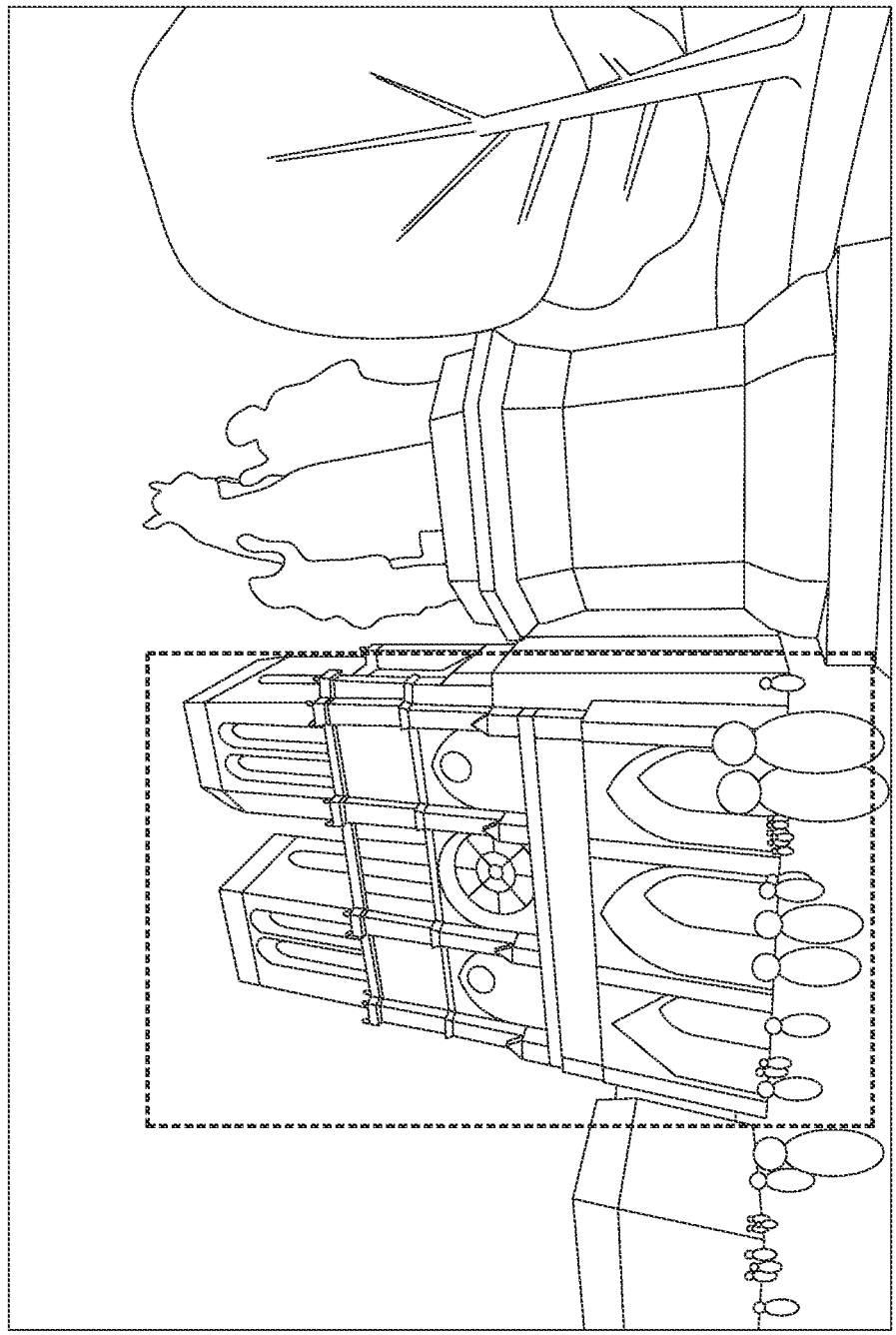
FIG. 21 is an image captured by an ultra-wide-angle camera module.

The image captured by the ultra-wide-angle camera module 70a enjoys a feature of multiple imaged objects. FIG. 21 is an image captured by the ultra-wide-angle camera module 70a.

Figure 22:
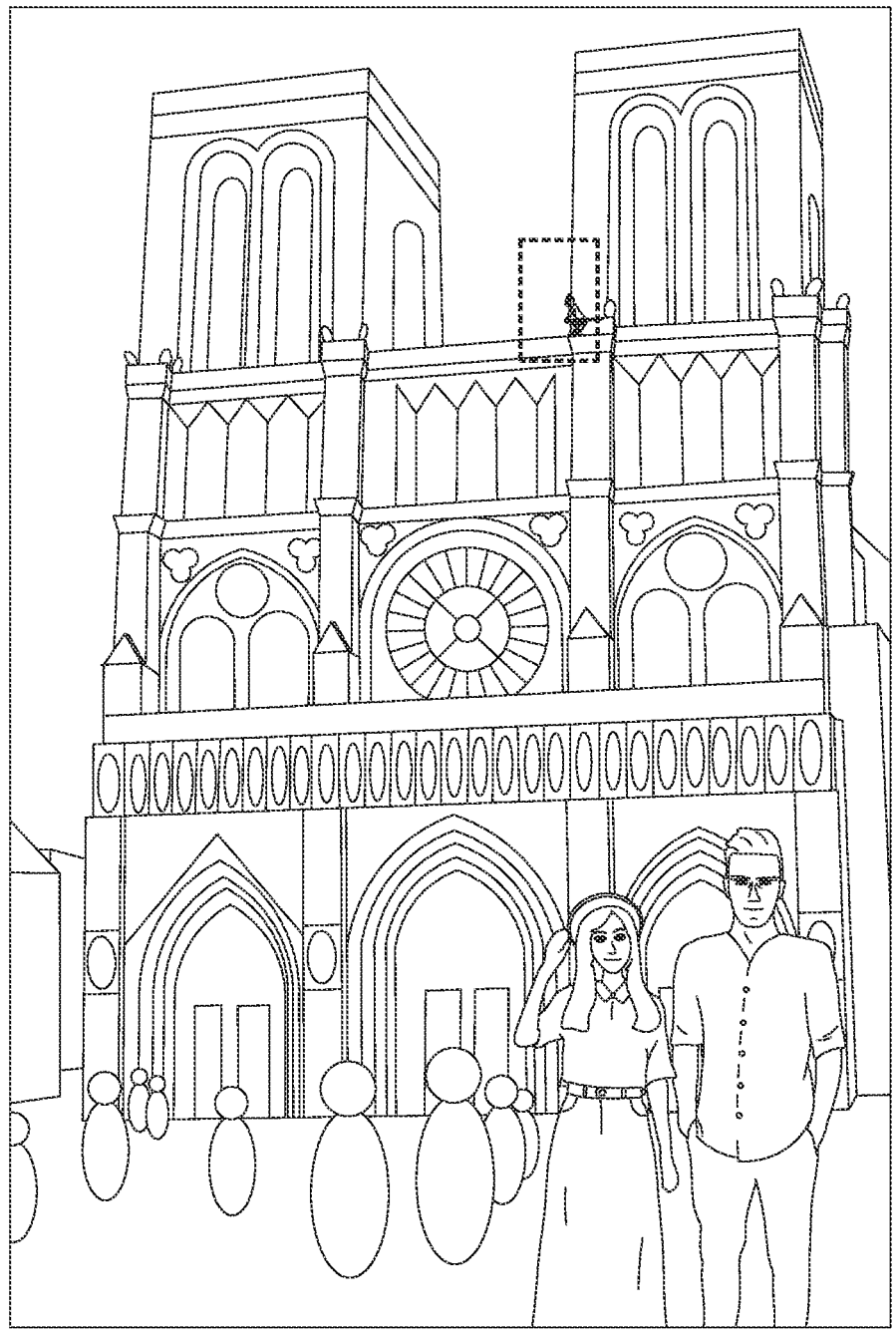
FIG. 22 is an image captured by a high pixel camera module.

The image captured by the high pixel camera module 70b enjoys a feature of high resolution and less distortion, and the high pixel camera module 70b can capture part of the image in FIG. 21. FIG. 22 is an image captured by the high pixel camera module 70b.

Figure 23:
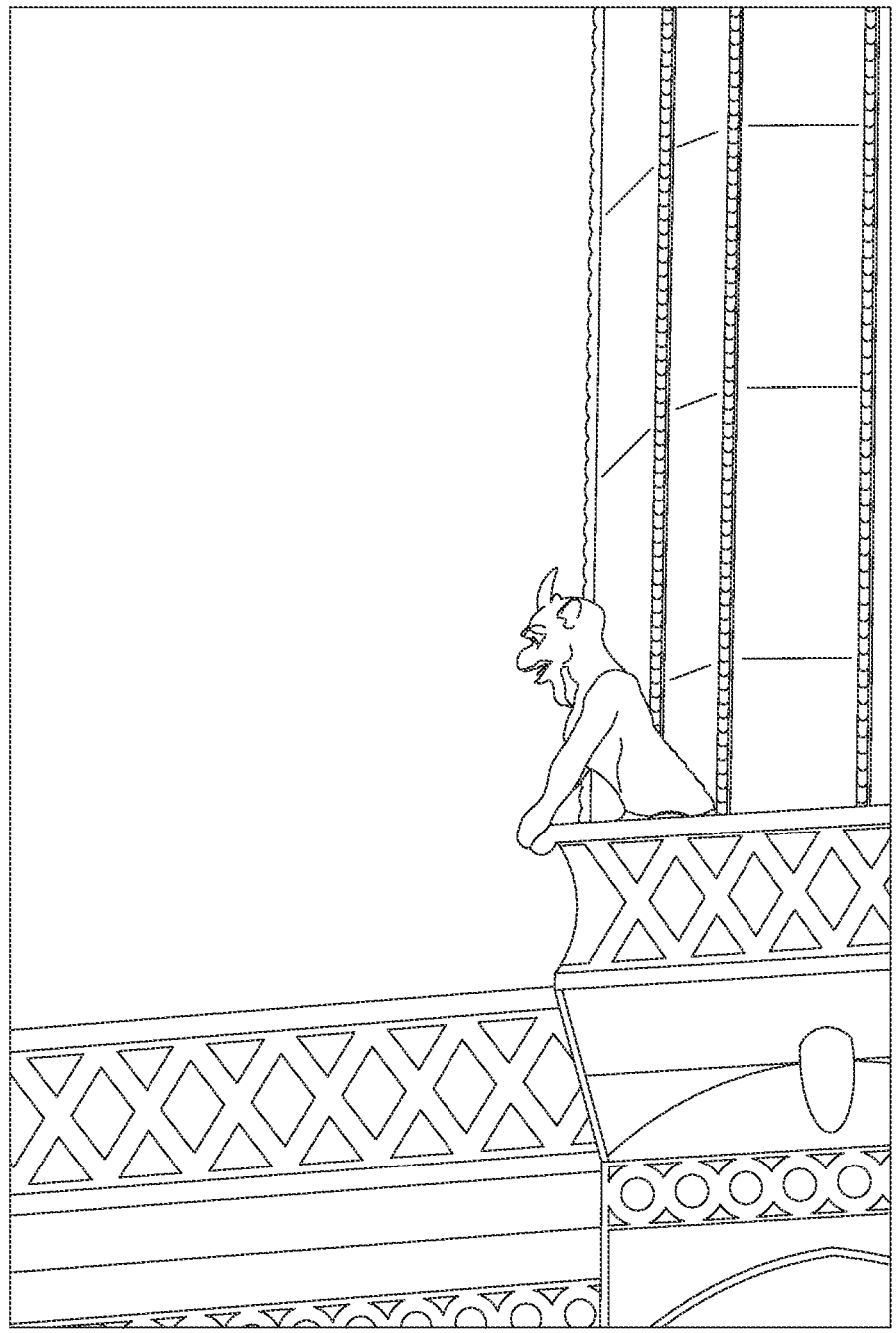
FIG. 23 is an image captured by a telephoto camera module.

The image captured by the telephoto camera module 70c enjoys a feature of high optical magnification, and the telephoto camera module 70c can capture part of the image in FIG. 22. FIG. 23 is an image captured by the telephoto camera module 70c. The maximum field of view (FOV) of the camera module 1 corresponds to the field of view in FIG. 23.

When a user captures images of an object, the light rays converge in the ultra-wide-angle camera module 70a, the high pixel camera module 70b or the telephoto camera module 70c to generate images, and the flash module 71 is activated for light supplement. The focus assist module 72 detects the object distance of the imaged object to achieve fast auto focusing. The image signal processor 73 is configured to optimize the captured image to improve image quality and provided zooming function. The light beam emitted from the focus assist module 72 can be either conventional infrared or laser. The display module 74 can include a touch screen, and the user is able to interact with the display module 74 and the image software processor having multiple functions to capture images and complete image processing. Alternatively, the user may capture images via a physical button. The image processed by the image software processor can be displayed on the display module 74.

8th Embodiment

Figure 24:
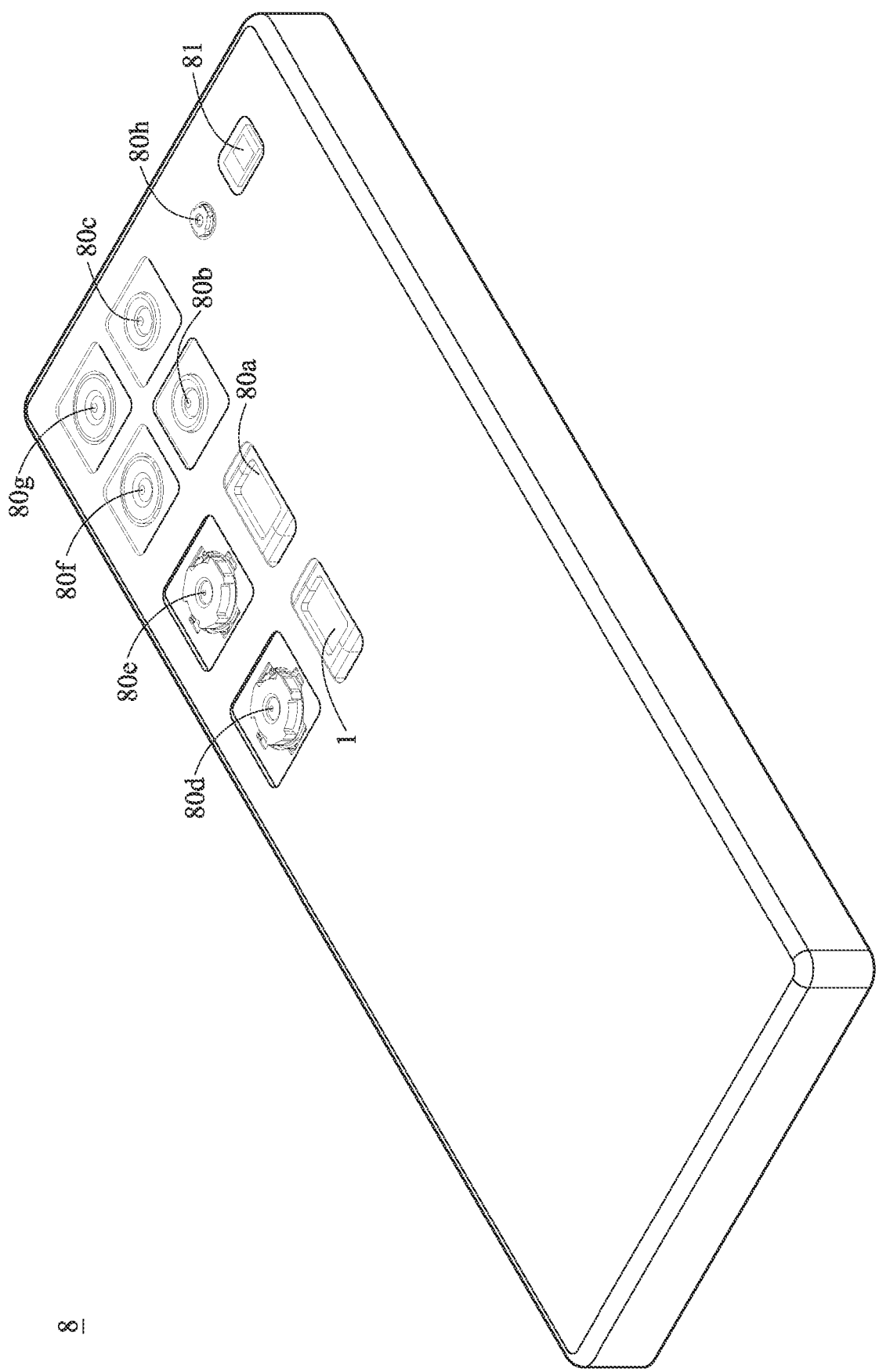
FIG. 24 is a perspective view of an electronic device according to the 8th embodiment of the present disclosure.

Please refer to FIG. 24, which is a perspective view of an electronic device according to the 8th embodiment of the present disclosure.

In this embodiment, an electronic device 8 is a smartphone including the camera module 1 disclosed in the 1st embodiment, a camera module 80a, a camera module 80b, a camera module 80c, a camera module 80d, a camera module 80e, a camera module 80f, a camera module 80g, a camera module 80h, a flash module 81, an image signal processor, a display module and an image software processor (not shown). The camera module 1, the camera module 80a, the camera module 80b, the camera module 80c, the camera module 80d, the camera module 80e, the camera module 80f, the camera module 80g and the camera module 80h are disposed on the same side of the electronic device 8, while the display module is disposed on the opposite side of the electronic device 8.

The camera module 1 is a telephoto camera module, the camera module 80a is a telephoto camera module, the camera module 80b is a telephoto camera module, the camera module 80c is a telephoto camera module, the camera module 80d is a wide-angle camera module, the camera module 80e is a wide-angle camera module, the camera module 80f is an ultra-wide-angle camera module, the camera module 80g is an ultra-wide-angle camera module, and the camera module 80h is a ToF (time of flight) camera module. In this embodiment, the camera module 1, the camera module 80a, the camera module 80b, the camera module 80c, the camera module 80d, the camera module 80e, the camera module 80f and the camera module 80g have different fields of view, such that the electronic device 8 can have various magnification ratios so as to meet the requirement of optical zoom functionality. In addition, the camera module 1 and the camera module 80a are telephoto camera modules having an optical folding component configuration. In addition, the camera module 80h can determine depth information of the imaged object. In this embodiment, the electronic device 8 includes a plurality of camera modules 1, 80a, 80b, 80c, 80d, 80e, 80f, 80g, and 80h, but the present disclosure is not limited to the number and arrangement of camera module. When a user captures images of an object, the light rays converge in the camera modules 1, 80a, 80b, 80c, 80d, 80e, 80f, 80g or 80h to generate an image(s), and the flash module 81 is activated for light supplement. Further, the subsequent processes are performed in a manner similar to the abovementioned embodiments, so the details in this regard will not be provided again.

The smartphones in the embodiments are only exemplary for showing the camera module of the present disclosure installed in an electronic device, and the present disclosure is not limited thereto. The camera module can be optionally applied to optical systems with a movable focus. Furthermore, the camera module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, having an optical axis and an optical curved surface through which the optical axis passes, and the camera module comprising:
   a fixed component;
   an optical folding component, disposed on the fixed component, wherein the optical folding component has a reflection surface configured to fold the optical axis, and the optical curved surface is disposed at an object side of the reflection surface;
   a first imaging unit, disposed at an image side of the optical folding component, wherein the first imaging unit comprises a first lens carrier and a first optical imaging lens assembly accommodated in the first lens carrier;
   a second imaging unit, disposed between the optical folding component and the first lens carrier of the first imaging unit, wherein the second imaging unit comprises a second lens carrier and a second optical imaging lens assembly, the second lens carrier is fixed on the fixed component, and the second optical imaging lens assembly is accommodated in the second lens carrier; and
   a first driving device, configured to move the first lens carrier along the optical axis with respect to the fixed component, and the first driving device comprising:
   a first driving magnet, disposed on the first lens carrier;
   a first driving coil, corresponding to the first driving magnet; and at least two location sensing components, corresponding to the first lens carrier;
   wherein the optical curved surface is an object-side surface of the optical folding component, and the optical folding component has positive refractive power through the optical curved surface;

wherein a distance in parallel with the optical axis between center points of two of the at least two location sensing components is DH, a distance by which the first lens carrier is movable along the optical axis with respect to the fixed component is D, a number of lens elements of the first optical imaging lens assembly is N1, a number of lens elements of the second optical imaging lens assembly is N2, a total number of lens elements of the camera module is Nt, and the following conditions are satisfied:

0.3<$DH/D$<9;

$N1$<$N2$; and $N1+N2$<$Nt$.

2. The camera module according to claim 1, wherein a distance by which the first lens carrier is movable along the optical axis with respect to the fixed component is D, and the following condition is satisfied:

0.2 [mm]≤$D$≤2.0 [mm].

3. The camera module according to claim 2, wherein the distance by which the first lens carrier is movable along the optical axis with respect to the fixed component is D, and the following condition is satisfied:

0.4 [mm]≤$D$≤1.5 [mm].

4. The camera module according to claim 2, further comprising a ball element disposed between the first lens carrier and the fixed component, wherein the first lens carrier is disposed on the fixed component via a support of the ball element.

5. The camera module according to claim 1, wherein a number of the first driving magnet is two, a number of the first driving coil is two, the first driving magnets are disposed symmetrical about the optical axis, and the first driving coils are disposed symmetrical about the optical axis.

6. The camera module according to claim 1, wherein a number of lens elements of the first optical imaging lens assembly is less than or equal to two.

7. The camera module according to claim 1, further comprising a second driving device, wherein the second driving device is configured to rotate the optical folding component with respect to the fixed component.

8. The camera module according to claim 1, wherein a maximum field of view of the camera module is FOV, and the following condition is satisfied:

1[deg.]≤FOV≤40[deg.].

9. The camera module according to claim 1, wherein a total length of the first lens carrier along the optical axis is L, and the following condition is satisfied:

1.0 [mm]<$L$<4.0 [mm].

10. A camera module, having an optical axis and an optical curved surface through which the optical axis passes, and the camera module comprising:
a fixed component;
an optical folding component, disposed on the fixed component, wherein the optical folding component has a reflection surface configured to fold the optical axis, and the optical curved surface is disposed at an object side of the reflection surface;
a first imaging unit, disposed at an image side of the optical folding component, wherein the first imaging unit comprises a first lens carrier and a first optical imaging lens assembly accommodated in the first lens carrier;
a second imaging unit, disposed between the optical folding component and the first lens carrier of the first imaging unit, wherein the second imaging unit comprises a second lens carrier and a second optical imaging lens assembly, the second lens carrier is fixed on the fixed component, and the second optical imaging lens assembly is accommodated in the second lens carrier; and
a first driving device, comprising:
a first driving magnet, disposed on the first lens carrier;
a first driving coil, corresponding to the first driving magnet, such that the first lens carrier is movable along the optical axis with respect to the fixed component; and
at least two location sensing components, corresponding to the first lens carrier;
wherein the optical curved surface is an object-side surface of of the optical folding component or is one of an object-side surface and an image-side surface of an optical element disposed at an object side of the optical folding component;
wherein a distance in parallel with the optical axis between center points of two of the at least two location sensing components is DH, a distance by which the first lens carrier is movable along the optical axis with respect to the fixed component is D, a number of lens elements of the first optical imaging lens assembly is N1, a number of lens elements of the second optical imaging lens assembly is N2, a total number of lens elements of the camera module is Nt, and the following conditions are satisfied:

0.3<$DH/D$<9;

$N1$<$N2$; and $N1+N2$<$Nt$.

11. The camera module according to claim 10, wherein the distance by which the first lens carrier is movable along the optical axis with respect to the fixed component is D, and the following condition is satisfied:

0.2 [mm]≤$D$≤2.0 [mm].

12. The camera module according to claim 11, wherein the distance by which the first lens carrier is movable along the optical axis with respect to the fixed component is D, and the following condition is satisfied:

0.4 [mm]≤$D$≤1.5 [mm].

13. The camera module according to claim 11, further comprising a positive lens element, wherein the optical curved surface is one of the object-side surface and the image-side surface of the optical element disposed at the object side of the optical folding component, and the positive lens element is the optical element disposed at the object side of the optical folding component.

14. The camera module according to claim 10, further comprising a ball element disposed between the first lens carrier and the fixed component, wherein the first lens carrier is disposed on the fixed component via a support of the ball element.

15. The camera module according to claim 10, wherein the distance in parallel with the optical axis between the center points of two of the at least two location sensing components is DH, and the following condition is satisfied:

0.37 [mm]<$DH$<4.5 [mm].

16. The camera module according to claim 10, wherein a number of the first driving magnet is two, a number of the first driving coil is two, the first driving magnets are disposed symmetrical about the optical axis, and the first driving coils are disposed symmetrical about the optical axis.

17. The camera module according to claim 16, wherein a number of the at least two location sensing components is two, and the location sensing components respectively correspond to the first driving magnets.

18. The camera module according to claim 10, wherein a number of the at least two location sensing components is three, and the location sensing components respectively correspond to three sides of the first driving magnet.

19. The camera module according to claim 10, wherein a number of lens elements of the first optical imaging lens assembly is less than or equal to two.

20. An electronic device, comprising:
the camera module of claim 10; and
an image sensor disposed on an image surface of the camera module.

* * * * *